United States Patent
Gunnam et al.

(10) Patent No.: US 12,373,261 B2
(45) Date of Patent: Jul. 29, 2025

(54) JUST-IN-TIME RE-PARTITIONING OF FEATURE MAPS FOR EFFICIENT BALANCING OF COMPUTE CORE WORKLOADS

(71) Applicant: Western Digital Technologies, Inc., San Jose, CA (US)

(72) Inventors: Kiran Kumar Gunnam, Santa Clara, CA (US); Vikram Varadarajan Kalkunte, Pleasanton, CA (US); Matheus Almeida Ogleari, San Jose, CA (US); Anand Kulkarni, San Jose, CA (US); Zvonimir Z. Bandic, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 609 days.

(21) Appl. No.: 17/854,592

(22) Filed: Jun. 30, 2022

(65) Prior Publication Data
US 2024/0004719 A1    Jan. 4, 2024

(51) Int. Cl.
*G06F 9/46* (2006.01)
*G06F 9/50* (2006.01)

(52) U.S. Cl.
CPC ............ *G06F 9/5061* (2013.01); *G06F 9/505* (2013.01)

(58) Field of Classification Search
None
See application file for complete search history.

(56) References Cited

U.S. PATENT DOCUMENTS

| | | |
|---|---|---|
| 10,963,787 B2 | 3/2021 | Zlateski et al. |
| 2018/0082181 A1 | 3/2018 | Brothers et al. |
| 2020/0192726 A1 | 6/2020 | Joo et al. |
| 2021/0303909 A1 | 9/2021 | Gunnam et al. |
| 2021/0303976 A1 | 9/2021 | Gunnam et al. |

FOREIGN PATENT DOCUMENTS

WO    2020190772 A1    9/2020

OTHER PUBLICATIONS

Mahmood Azhar Qureshi, et al., Sparse-PE: A Performance-Efficient Processing Engine Core for Sparse Convolutional Neural Networks, Nov. 2021, IEEE Access PP(99):1-1, 18 pp.
(Continued)

*Primary Examiner* — Gregory A Kessler
(74) *Attorney, Agent, or Firm* — PATTERSON + SHERIDAN, LLP

(57) ABSTRACT

Certain aspects of the present disclosure provide techniques for partitioning feature maps to improve machine learning model processing. In one aspect, a method, includes partitioning a feature map row-wise into a plurality of feature sub-maps such that: each respective feature sub-map of the plurality of feature sub-maps is defined with respect to a split row determined based on a dense data element count for each row of the feature map; and each feature sub-map of the plurality of feature sub-maps has a same column dimensionality as the feature map; and assigning each of the plurality of feature sub-maps to one of a plurality of tensor compute units and one of a plurality of tensor feature map memory units for processing in parallel.

20 Claims, 14 Drawing Sheets

(56) References Cited

OTHER PUBLICATIONS

Ashish Gondimalla, et al., SparTen: A Sparse Tensor Accelerator for Convolutional Neural Networks, MICRO'19, Oct. 12-16, 2019, Columbus, OH, USA, 15 pp.

Aimar, et al., NullHop: A Flexible Convolutional Neural Network Accelerator Based on Sparse Representations of Feature Maps, IEEE Transactions on Neural Networks and Learning Systems, IEEE, 2018, 13 pp.

Zhuang Shao, et al., Memory-Efficient CNN Accelerator Based on Interlayer Feature Map Compression, Oct. 2021, 14 pp.

JUST-IN-TIME RE-PARTITIONING OF FEATURE MAPS FOR EFFICIENT BALANCING OF COMPUTE CORE WORKLOADS

INTRODUCTION

Machine learning algorithms are used in a wide variety of applications, such as medical imaging, computer vision, advertising, gaming, etc. Generally speaking, machine learning algorithms process a large amount of input data to perform their given task. As the amount of input data increases, the computation time and computational resources needed to process the input data also increases. Accordingly, there is a need for improved techniques for processing machine learning data.

SUMMARY

In one aspect, an apparatus, comprises a tensor compute cluster comprising a plurality of tensor compute units configured to process a plurality of feature sub-maps in a machine learning application; a tensor memory cluster comprising a plurality of tensor feature map memory units configured to store the plurality of feature sub-maps; and processing circuitry configured to: partition a feature map row-wise into the plurality of feature sub-maps such that: each respective feature sub-map of the plurality of feature sub-maps is defined with respect to a split row determined based on a dense data element count for each row of the feature map; and each feature sub-map of the plurality of feature sub-maps has a same column dimensionality as the feature map; and assign each of the plurality of feature sub-maps to one of the plurality of tensor compute units and one of the plurality of tensor feature map memory units for processing in parallel.

In another aspect, an apparatus, comprises a tensor compute cluster comprising a plurality of tensor compute units configured to process a plurality of feature sub-maps in a machine learning application; a tensor memory cluster comprising a plurality of tensor feature map memory units configured to store the plurality of feature sub-maps; and processing circuitry configured to: partition a feature map row-wise into the plurality of feature sub-maps such that: each respective feature sub-map of the plurality of feature sub-maps is defined with respect to a split row determined based on a sparse data element count for each row of the feature map; and each feature sub-map of the plurality of feature sub-maps has a same column dimensionality as the feature map; and assign each of the plurality of feature sub-maps to one of the plurality of tensor compute units and one of the plurality of tensor feature map memory units for processing in parallel.

In another aspect, a method, comprises: partitioning a feature map row-wise into a plurality of feature sub-maps such that: each respective feature sub-map of the plurality of feature sub-maps is defined with respect to a split row determined based on a dense data element count for each row of the feature map; and each feature sub-map of the plurality of feature sub-maps has a same column dimensionality as the feature map; and assigning each of the plurality of feature sub-maps to one of a plurality of tensor compute units and one of a plurality of tensor feature map memory units for processing in parallel.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
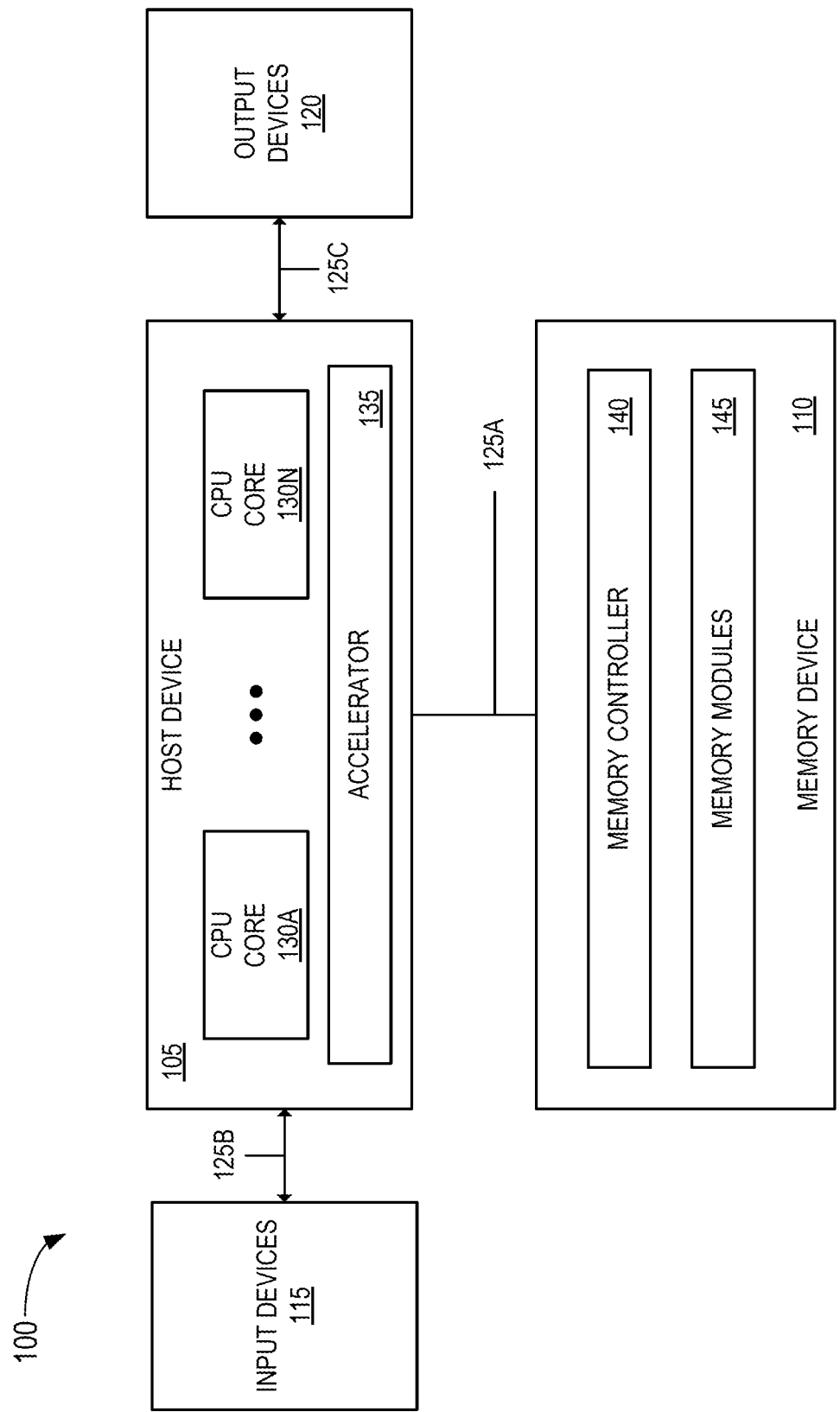
FIG. 1 is an example block diagram of a computing system, in accordance with some embodiments of the present disclosure.

In the drawings, similar symbols typically identify similar components, unless context dictates otherwise. The illustrative embodiments in the drawings are not meant to be limiting. Other embodiments may be utilized, and other changes may be made, without departing from the spirit or scope of the subject matter presented here. It will be readily understood that the aspects of the present disclosure illustrated in the drawings can be arranged, substituted, combined, and designed in a wide variety of different configurations, all of which are explicitly contemplated and made part of this disclosure. In the following detailed description, reference is made to the aforementioned drawings.

DETAILED DESCRIPTION

Machine learning architectures are generally getting larger and more complex as they are deployed for ever more sophisticated processing tasks in a broader scope of scenarios. The growth in model size engenders a concomitant growth in computational intensity for performing the processing tasks, including increased processor and memory access cycles and relatedly increased processing time, heat generation, and energy use. Using neural network models as an example, larger (e.g., deeper and more parameterized) neural networks intensify the computation and memory access burden for a given task implemented by such networks.

To address such challenges, techniques may be used to reduce the amount of data that is processed and/or to reduce the computational complexity and/or time. For example, weight encoding via quantization and entropy coding can shrink the size of weights and thus reduce the computational complexity of processing data with the weights.

As another example, sparse input data may be exploited to reduce computational complexity and/or time. Sparsity of input data may generally refer to the number or percentage of zeroes in the input data. For example, an input data vector with values [0, 0, 0, 1] might be said to be 75% sparse, or, alternatively, 25% dense because three of the four data elements (or entries) are zero-valued, and only one is non-zero-valued. Because of the nature of various machine learning model mathematical operations, the sparse data elements may be bypassed to save processing time and power.

Sparsity in machine learning model data processing may be either static or dynamic. Generally speaking, static sparsity is known offline (e.g., before inferencing time) and may not change from one set of input data to another set of input data. For example, the sparsity in weights of a machine learning model may be considered static because the zero and non-zero weight values are known before inference time and the weights generally remain the same from one set of input data to the next.

Dynamic sparsity, on the other hand, is not known beforehand and generally changes both from one input data set to the next, and during processing of each input data set through a model (e.g., at inference time). For example, the sparsity of input data processed by a neural network model may change as it is processed through different layers of the neural network model and thus may be considered dynamic.

Consider an example in which one or more feature maps are generated from raw input data (e.g., an input image), and each feature map has some distribution of zero values and non-zero values. The number or percentage of non-zero values in a given feature map generated based on the input data determines the sparsity of that feature map. Each of the feature maps may be processed with model parameters (e.g., weights and biases) in a model layer and then processed by an activation function to generate output data from the model layer. Since each feature map may be different from other feature maps, the location of the zero and non-zero values may change from one feature map to another, and thus the sparsity between feature maps is dynamic. Further, as feature maps are processed to generate intermediate and output feature maps, sparsity may be further affected. For example, an activation function like ReLU may induce significant sparsity in downstream feature maps as all negative values input to ReLU become zero-valued outputs.

By its nature, static sparsity is easier to identify and exploit when processing machine learning models. Thus, many techniques for increasing efficiency of machine learning model processing rely on static sparsity only, and are often only applicable to sparse weight data. The irregularity caused by dynamic sparsity prevents many conventional efficiency techniques from being used on, for example, input data and feature maps. However, the amount of dynamically sparse input data that needs to be retrieved from memory and processed by a machine learning model may greatly exceed the amount of statically sparse weight data. Accordingly, exploiting dynamic sparsity may significantly improve the efficiency of processing machine learning models, which beneficially reduces processor and memory access cycles and relatedly reduces processing time, heat generation, and energy use.

Another challenge of dynamic sparsity arises when processing parallelism is employed to increase machine learning model processing speed. That is, because the dynamic sparsity is unpredictable, the processing loads generated by dynamically sparse data can become significantly unbalanced across parallel processing units, such as machine learning model processing cores in machine learning model accelerators. This imbalance can cause uneven heat distribution in processing hardware, which may lead to degraded performance and even damage. For example, as over-allocated processing cores heat up, they may have to derate, which may then create processing bottlenecks downstream where the parallel data is recombined. Accordingly, dynamically sparse data can degrade the conventional advantage of parallel processing, which is widely deployed for machine learning model processing.

Unfortunately, conventional attempts to exploit dynamic sparsity have often traded efficiency in one aspect for inefficiency in another aspect of the machine learning model processing. For example, exploiting dynamic sparsity may incur significant additional processing overhead such that the overall processing has no net benefit.

Aspects of the present disclosure provides techniques for exploiting dynamic sparsity "just-in-time" without significant memory and/or processing overhead, which allows for the aforementioned benefits of dynamic sparsity exploitation without the aforementioned problems. Specifically, aspects of the present disclosure provides a means for efficiently splitting feature maps into feature sub-maps along a single dimension (e.g., row-wise) with balanced sparsity between the feature sub-maps. These balanced sparsity feature sub-maps may then be processed in parallel with compute units. The balanced sparsity in the feature sub-maps allows for balanced loading of the compute units, which improves processing efficiency and avoids processing bottlenecks. Further benefits include evenly distributing heat generation across the compute units, which avoids local hot spots and related performance derating, which can lead to increased processing times and latencies.

Example Multi-Core Computing Device

FIG. 1 depicts an example block diagram of a computing system 100, in accordance with some embodiments of the disclosure. The computing system 100 includes a host device 105 associated with a memory device 110. The host device 105 is configured to receive input from one or more input devices 115 and provide output to one or more output devices 120. The host device 105 is configured to communicate with the memory device 110, the input devices 115, and the output devices 120 via appropriate interfaces 125A, 125B, and 125C, respectively. The computing system 100 may be implemented in a variety of computing devices such as computers (e.g., desktop, laptop, servers, data centers, etc.), tablets, personal digital assistants, mobile devices, wearable computing devices, such as smart watches, other handheld or portable devices, other smart devices, such as home speakers, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, image data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device. The CPU cores 130A-130N are shown as a non-limiting representative example of integrated circuits that can perform processing functions, and may be substituted and/or combined with a Field Programmable Gate Array ("FPGA"), Graphical Processing Unit ("GPU"), Neural Processing Unit (NPU), Tensor Processing Unit (TPU), Application Specific Integrated Circuit ("ASIC"), and the like. In some embodiments, the instructions and data needed to run the one or more applications may be stored within the memory device 110. The host device 105 may also be configured to store the results of running the one or more applications within the memory device 110. The host device 105 may also include an accelerator 135. The accelerator 135 may be used, for example, to perform machine learning operations. An example of accelerator 135 is discussed in greater detail in FIG. 2. Although the accelerator 135 is shown as being part of the host device 105 in FIG. 1, in other embodiments, the accelerator may be apart from the host device and communicatively coupled (e.g., through a bus or network connection) to the host device. In such a case, the accelerator 135 may also be communicatively coupled to the memory device 110, be a part of the memory device 110, or include its own separate memory device.

To facilitate communication with the memory device 110, the memory device may include or be associated with a memory controller 140. Although the memory controller 140 is shown as being part of the memory device 110, in some embodiments, the memory controller may instead be part of the host device 105 or another element of the computing system 100 and operatively associated with the memory device. The memory controller 140 may be configured as a logical block or circuitry that receives instructions from the host device 105 (e.g., the accelerator 135) and performs operations in accordance with those instructions. The memory device 110 may include one or more memory modules 145 that store data and instructions. The memory modules 145 may be any of a variety of memory types, including a variety of volatile memories, non-volatile memories, or a combination thereof. For example, in some embodiments, one or more of the memory modules 145 or portions thereof may include NAND flash memory cores. In other embodiments, one or more of the memory modules 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory modules 145 or portions thereof may be configured as other types of storage class memory ("SCM"). Generally speaking, the memory modules 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the accelerator 135, the memory controller 140, and the memory modules 145 may include other hardware, software, and/or firmware components that are considered necessary or desirable in performing the functions described herein. In addition, in certain embodiments, the memory device 110 may integrate some or all of the components of the host device, including, for example, the CPU cores 130A-130N and/or the accelerator 135.

Example Accelerator for Performing Machine Learning Operations

Figure 2:
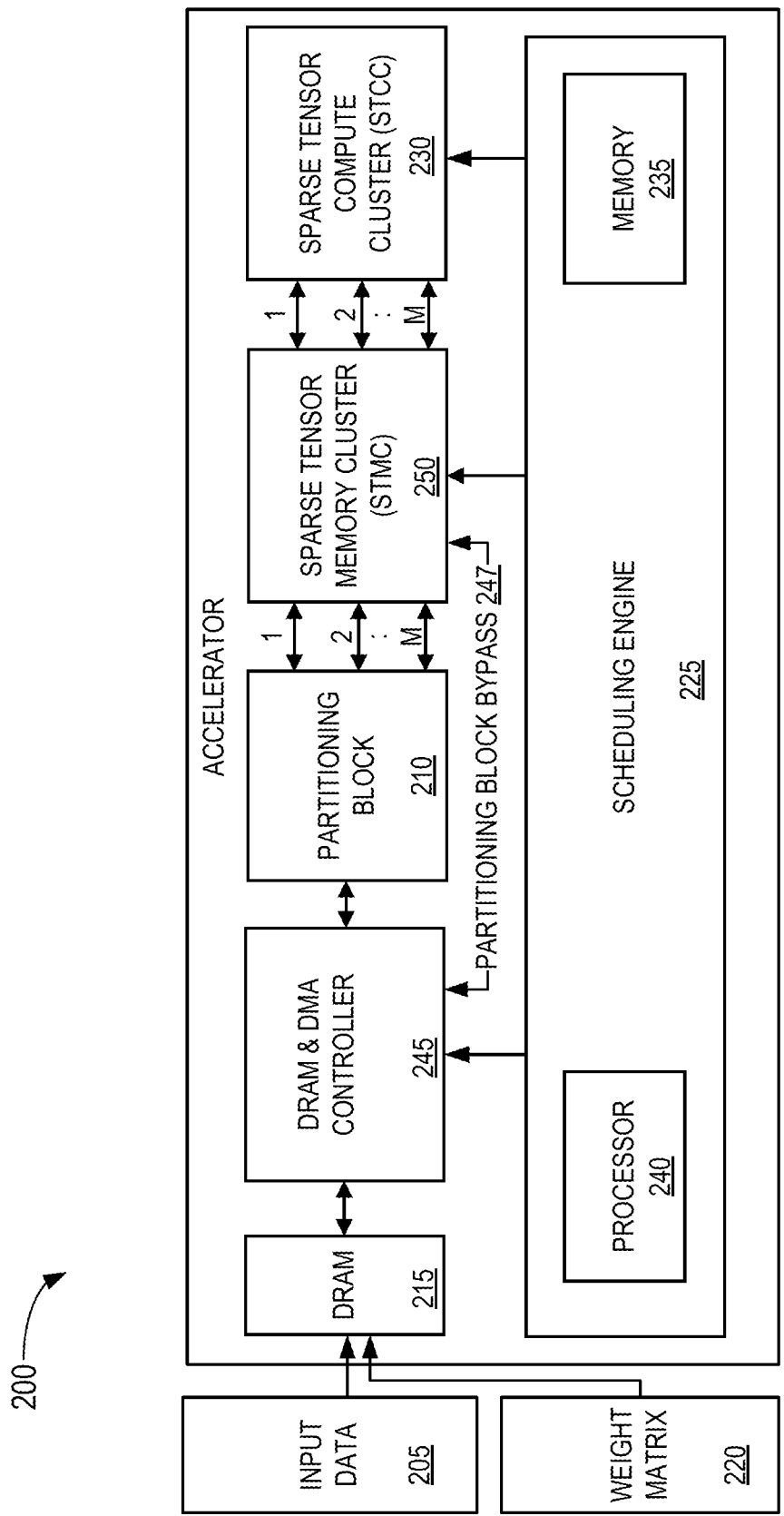
FIG. 2 is an example block diagram of an accelerator of the computing system of FIG. 1, in accordance with some embodiments of the present disclosure.

FIG. 2 depicts an example accelerator 200, in accordance with some embodiments of the present disclosure. Accelerator 200 is an example of accelerator 135 of FIG. 1. Thus, although not shown, accelerator 200 may be associated with a host device (e.g., host device 105) and a memory device (e.g., memory device 110). Accelerator 200 may be used to optimize machine learning operations, for example, in a convolutional neural network (CNN) or other type of machine learning architecture. Although processing with accelerator 200 is explained with respect to CNN models in some examples herein, in other examples, accelerator 200 may be used for processing other types of machine learning models as well. Generally speaking, accelerator 200 may be used in any type of application (whether machine learning or otherwise) that desires to increase efficiency of data processing.

In some embodiments, accelerator 200 may be configured to exploit dynamic and static sparsity in the feature maps and the weights, respectively, and to allocate computation amongst various compute cores (or other distinct compute units) based on the dynamic and static sparsity. As above, the ability to address the dynamic and static sparsity may increase processing efficiency as well as balance processing performance of computational hardware, such as sparse tensor compute cluster 230.

For example, accelerator 200 may receive input data 205 (e.g., an input image from the host device 105) that is to be processed with one or more machine learning operations. It is to be understood that although input image data is used herein as an example of input data 205, accelerator 200 may be used to process other types of data including video, text, and any other type of data that may benefit from being processed by accelerator 200.

Input data 205 may comprise an array (or tensor) of pixels of image data. For example, input data 205 may comprise a 1024×1024×3 (e.g., h×w×d) array of image data pixels representing an image that is 1024 pixels high, 1024 pixels wide, and includes 3 color channels (e.g., red, green, blue) for each pixel. In some embodiments, the 1024×1024×3 array of pixels (input data 205) may be divided into three feature maps, with each feature map representing one color and being of size 1024×1024×1 (also referred to herein as simply 1024×1024). Further, each feature map may be represented as a matrix (or tensor) having a plurality of rows and a plurality of columns in which each row extends in a first direction (e.g., left-right or 'X" direction) and each column extends in a second direction (e.g., up-down or 'Y' direction). Each pixel of a feature map may correspond to one cell (e.g., formed at the intersection of one row and one column) of the matrix. Thus, a 1024×1024 feature map may be represented by a matrix having 1024 rows and 1024 columns, with the intersection of each row and each column forming one cell for one pixel having some value, which may be zero or non-zero. Each pixel value may be referred to as a data element within the matrix.

Accelerator 200 also includes a direct memory access controller 245 configured to transfer input data 205 stored in DRAM 215 to the partitioning block 210 or directly to sparse tensor memory cluster (STMC) 250 via partitioning block bypass 247, which in various aspects may be a software-based or hardware-based bypass. In some cases, the output of partitioning block 210 may be provided directly to STMC 250 without the need to write back to DRAM 215; however in other cases partitioning block 210 may write back to DRAM 215 to await further processing. In such cases, scheduling engine 225 may case DRAM & DMA controller 245 to provide the partitioned feature sub-maps directly to STMC 250. It is noted while direct memory access is used as an example for illustration, other type of memory access protocols/methods may be used, including memory access across communication buses and memory fabrics.

Further, partitioning block bypass 247 may be used for providing weight data that will not be partitioned by partition block 210 directly to STMC 250. For example, partitioning block bypass 247 could include a unidirectional bus 430 as described with respect to FIG. 4 and a unidirectional bus 540 as described with respect to FIG. 5.

In some embodiments, the feature maps based on the input data 205 may be generated by accelerator 200. For example, in some embodiments, partitioning block 210 may be configured to generate the feature maps from the input data 205. In other embodiments, a feature map block (not shown) of accelerator 200 may receive the input data 205, and generate the feature maps therefrom, and send those feature maps to partitioning block 210. In yet other embodiments, the feature maps from the input data 205 may be generated outside of accelerator 200, and instead of the input image, the feature maps may be input into accelerator (e.g., stored in DRAM 215 for further processing). Partitioning block 210 may be configured in software, hardware, firmware, or combinations thereof.

Each of the feature maps generated from input data 205 may be further sub-divided into one or more feature sub-maps in the partitioning block 210. The sub-division of a feature map into one or more feature sub-maps in the partitioning block 210 is discussed in more detail with respect to FIGS. 3, 10, 11, and 12, below. Each feature sub-map may also referred to herein as an input tensor. By dividing a feature map into one or more feature sub-maps, in which each of the feature sub-maps has a similar amount of sparsity, each of the feature sub-maps may be independently processed in parallel (e.g., using sparse tensor compute clusters 230) to generate an output feature sub-map and to increase performance. The output feature sub-maps may then be combined together to create an output feature map.

Thus, for example, when input data 205 comprises an image with multiple color channels, the feature maps of each channel may be sub-divided into one or more feature sub-maps having similar sparsity levels, and each of the feature sub-maps may then be processed independently to generate an output feature sub-map. The output feature sub-maps may then be combined to generate a channel output feature map. The various channel output feature maps may then be combined to generate the output feature map. In some embodiments, the feature maps and/or each of the feature sub-maps may be compressed to reduce storage space and further increase performance.

In some embodiments, partitioning block 210 may retrieve initial feature maps from the input data 205 from DRAM 215 (e.g., by way of DRAM & DMA controller 245), and may then store the partitioned feature sub-maps back in DRAM 215 while awaiting further processing in sparse tensor compute cluster 230. Partitioning block 210 may also store the partitioned feature sub-maps directly in sparse tensor memory cluster 250. In some cases, whether not to store one or more partitioned feature sub-maps in DRAM 215 may depend on whether sufficient memory is available within sparse tensor memory cluster 250 when partitioning is complete.

In some embodiments, DRAM 215 may also be configured to store a weight matrix 220. In some embodiments, DRAM 215 may also store various training models, schedules, and other information needed to process the input data 205. Further, although only DRAM 215 is shown in accelerator 200, in some embodiments, accelerator 200 may include additional and/or other types of memories. For the sake of simplicity, DRAM 215 is used in the description, but other memory substitutes are contemplated for various embodiments.

For example, in some embodiments, accelerator 200 may additionally or alternatively include SRAM, storage class memory such as MRAM, ReRAM, and/or flash memories to store the feature maps, the one or more feature sub-maps, various outputs, training models, schedules, and/or other information needed to process the input data 205. When such multiple memories are provided in accelerator 200, in some embodiments, these memories may be interconnected with each other and configured to communicate with each other. In some embodiments, DRAM 215 and any other memory in accelerator 200 may be part of the memory device (e.g., the memory device 110) associated with the host device (e.g., the host device 105) of which accelerator is part of. In some embodiments, one or more of DRAM 215 and any other memory in accelerator 200 may be separate from the memory device (e.g., the memory device 110).

In addition to the input data 205, accelerator 200 also receives the weight matrix 220 (e.g., from the host device 105). The weight matrix 220 may include weights that are to be applied to each of the feature sub-maps. The weight matrix 220 may also be referred to herein as a kernel or a filter, such as a convolution kernel or convolution filter. The weight matrix 220 may include at least one row and at least one column, forming cells at the intersection of rows and columns. The weight matrix 220 may be used to perform, for example, convolution operations on the input data 205. In some embodiments, the weight matrix 220 may also be sub-divided into one or more sub-weight maps similar to the feature maps. In some embodiments, the weight matrix 220 and/or the sub-weight maps may also be compressed similar to the feature maps/feature sub-maps. In some embodiments, the weight matrix 220 may be received by a scheduling engine 225. In other embodiments, the weight matric 220 may be received by the partitioning block 210 or by another component of accelerator 200. Further, if the weight matrix 220 is sub-divided into sub-weight maps and/or compressed, these processes may occur within the scheduling engine 225 in some embodiments. In other embodiments, these processes may occur in partitioning block 210, in a separate partitioning block in accelerator 200 dedicated to the weight matrix 220, and/or outside accelerator. The weight matrix 220 and/or the sub-weight maps may be stored within DRAM 215, the scheduling engine 225, or in any other memory of accelerator 200.

In some embodiments, the scheduling engine 225 is configured to perform a sparsity analysis, and assign each of the feature maps to a compute unit based upon the sparsity. As used herein with respect various data (e.g., input data and weight data) processed in machine learning operations, "sparsity" refers to the proportion or percentage of sparse data elements (e.g., zeroes or values below a sparse value threshold) in a given input data and "density" means the proportion or percentage of dense data elements (e.g., non-zeroes or values above a sparse value threshold) in a given input data. A feature map that has more non-zeroes than zeroes may be referred to as a less sparse feature map or a more dense feature map, whereas, a feature map that has more zeroes than non-zeroes may be referred to as a more sparse and less dense feature map. In one example, a sparse feature map may be defined as having at least a certain percentage of zeros (e.g., ≥80%), and a dense feature map may have at least a certain percentage of non-zeroes (e.g., >20%). Note that such percentages, or other thresholds, may be defined based on implementation and, for example, underlying characteristics of input data processed by an accelerator, such as accelerator 200. Thus, to perform the sparsity analysis, the scheduling engine 225 may determine the number or percentage of sparse data elements (e.g., zeros) and/or dense data elements (e.g., non-zeroes) in a feature map. Further, the scheduling engine 225 may assign or allocate a sparse feature map to a sparse tensor compute cluster 230 for processing. Thus, the sparse tensor compute cluster 230 is configured to process feature maps having higher sparsity (e.g., number or percentage of zeroes above a threshold, such as more zero values than non-zero values). The sparse tensor compute cluster 230 is discussed in greater detail below.

Figure 3:
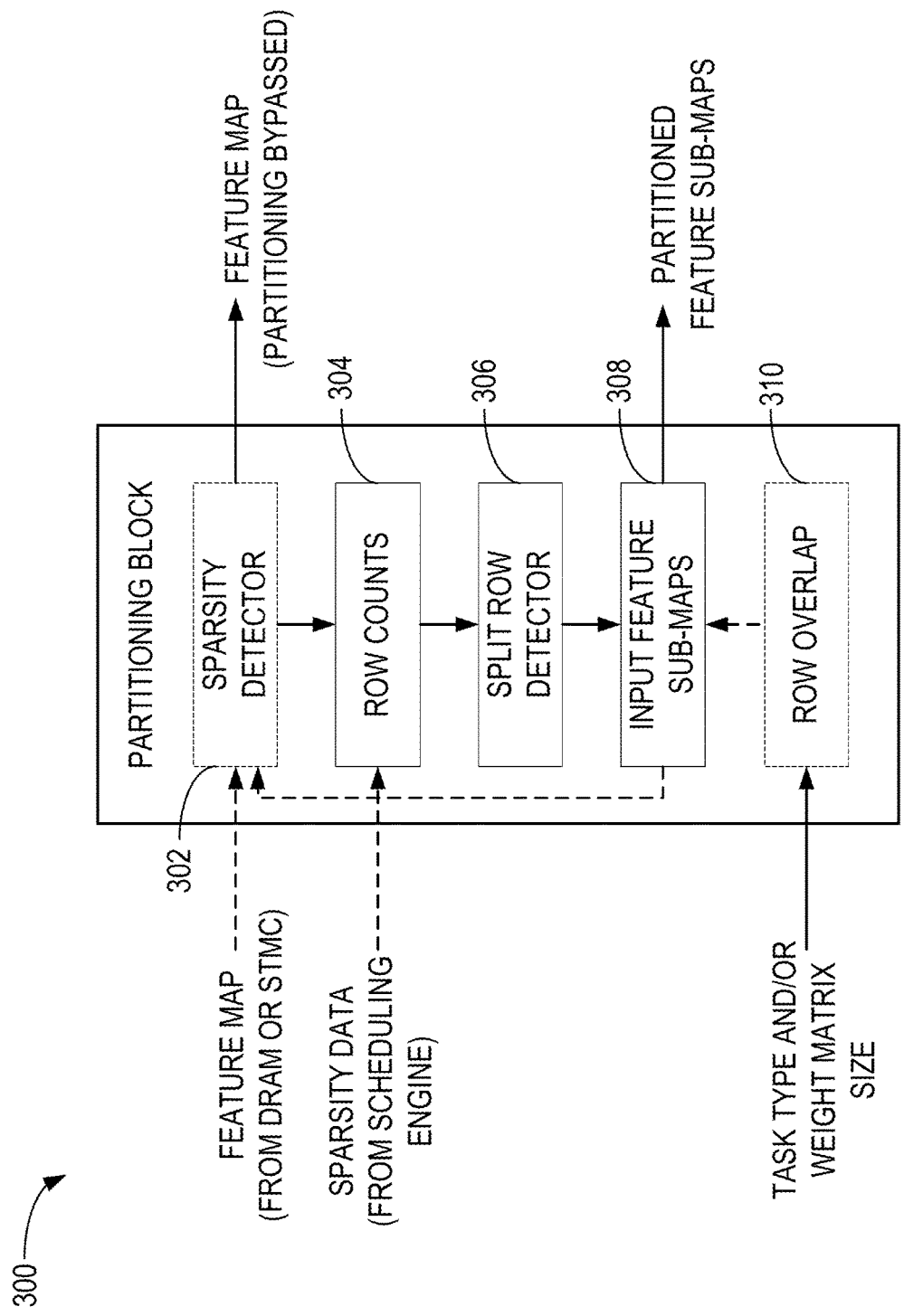
FIG. 3 depicts an example of a partitioning block, in accordance with some embodiments of the present disclosure.

As depicted in FIG. 3, when scheduling engine 225 performs a sparsity analysis, it may provide sparsity data, such as counts of sparse and/or dense elements in each row of a feature map, to partitioning block 210. Alternatively, partitioning block 210 may be capable of and configured to perform sparsity detection in some embodiments.

In some embodiments, accelerator 200 may also include a dense tensor compute cluster (not shown in FIG. 2) and/or a vector accelerator (also not shown in FIG. 2). If provided, the dense tensor compute cluster may be configured to process feature maps having lower sparsity (e.g., feature maps in which the number or percentage of zeroes is below a threshold, such as having more non-zero values than zero values) and the vector accelerator may be used to process feature maps that cannot be processed by either the dense tensor compute cluster or the sparse tensor compute cluster 230. For example, in some embodiments where a dense tensor compute cluster and sparse tensor compute cluster 230 are both provided, each may be configured with a defined or supported list of operations that one of or both of the dense tensor compute cluster and sparse tensor compute cluster 230 are able to perform. If the processing requires performing an operation that is not supported by either of the dense tensor compute cluster or the sparse tensor compute cluster 230, then that operation may be performed by an alternative computing element, such as a vector accelerator. In some embodiments, the vector accelerator may be an open source vector accelerator based on RISC-V, such as LACore. In other embodiments, other types of suitable vector accelerators may be used for the vector accelerator. A dense tensor compute cluster and a vector accelerator are discussed in greater detail in the U.S. application Ser. No. 16/726,084, the entirety of which is incorporated by reference herein.

Scheduling engine 225 includes memory 235 to store computer-readable instructions that may be executed by a processor 240 to perform the operations of the scheduling engine 225. The memory 235 may be part of the memory device (e.g., the memory device 110) of the host device (e.g., the host device 105) of which accelerator 200 is part of, or may be provisioned from a separate memory. Further, the scheduling engine 225 may be implemented as software, hardware, firmware, or combination thereof. The processor 240 may be part of or may be similar to the CPU cores 130A-130N of the host device 105, or in the case when accelerator is part of the memory device 110, part of a processor or controller of the memory device.

It is to be understood that only selected components of accelerator 200 are shown in FIG. 2 for clarity and ease of description. Accelerator 200 may include other or additional components that may be needed or considered desirable in performing the operations described herein.

Example Partitioning Block

FIG. 3 depicts an example 300 of a partitioning block, such as partitioning block 210 of FIG. 2, in accordance with some embodiments of the present disclosure. Generally, partitioning block 300 may be configured to perform partitioning of feature maps to generate feature sub-maps with balanced sparsity. As above, these sparsity-balanced feature sub-maps may then be processed downstream, such as by STCC 230 of FIG. 2, and the balanced sparsity may engender the various benefits described above, including balanced loading of sparse tensor compute units, leading to better overall performance of an accelerator.

As discussed above with respect to FIG. 2, in some embodiments, scheduling engine 225 may provide sparsity data, such as row counts of sparse and/or dense elements, directly to partitioning block, as depicted in FIG. 3 by the broken line into row counts 304.

In another embodiment, a feature map may instead be provided to an optional sparsity detector 302 of the partitioning block in FIG. 3. The feature map may be provided from, for example, a DRAM, such as DRAM 215 in FIG. 2 (e.g., by way of DRAM & DMA controller 245), or from a sparse tensor memory cluster (STMC), such as STMC 250 in FIG. 2. Thus, in some cases the feature map may be an initial, or input feature map, and in other cases, the feature map may be an intermediate feature map.

In one embodiment, sparsity detector 302 determines a sparsity for each row of the feature map. For example, consider an example in which the feature map includes N=4 rows, and row n (where n∈{1 . . . N}) of the feature map includes the values [0, 0, 0, 1]. The sparsity for row n would thus be 75% based on the three zero-valued (or sparse) data elements in row n and one non-zero-valued (or dense) data element in row n. Note that while this example uses integer values, continuous values could likewise be used and a threshold may be used to determine sparsity. Accordingly, in another example, if row n of the feature map included the values [0.1, 0.2, 0.1, 0.9], and the sparsity cutoff value was 0.3 such that row entries having values ≤0.3 are counted as sparse, and values >0.3 are counted as non-sparse (or dense), then the sparsity for row n would be 75% with three sparse data elements in row n and one dense data element in row n. Note that because sparsity and density of input data are related to each other (e.g., the percentage sparsity is 1−the percentage density, and vice versa), sparsity detection may be based on a count of sparse or dense data elements.

Sparsity detector 302 may initially determine a count (e.g., number) of sparse or dense data elements in each row of the feature map. In some aspects, determining the count of dense data element values may be performed in an upstream process, such as during a compression process, in which case there may be added efficiency to determining sparsity based on the count of dense data elements in each row of the feature map. These row counts 304 may be stored in a memory (not depicted), such a local memory in accelerator 200 of FIG. 2 and may be associated with a feature map, such as by an ID or index.

If sparsity detector 302 determines a sparsity of the feature map $S_{map}$ is less than a threshold value $S_{thesh}$, e.g., $S_{map} < S_{thesh}$, then partitioning may be skipped and the feature map may be forwarded on for processing, such as to a dense tensor compute cluster, as described above. In this case, the overhead of splitting the feature map into feature sub-maps and then processing the feature sub-maps in sparse tensor compute units may overwhelm any benefit of the partitioning because the sparsity is low. Note that $S_{map}$ may be determined based on a number of sparse data elements S in the feature map X divided by the total number of elements in the feature map $X_{num\_elem}$, so that $S_{map} = S/X_{num\_elem}$. Alternatively, $S_{map}$ may be determined based on a number of dense data elements D in the feature map X divided by the total number of elements in the feature map $X_{num\_elem}$ and subtracted from 1, so that $S_{map} = 1-(D/X_{num\_elem})$. For an example in which the feature map is two-dimensional, then $X_{num\_elem}$ may be calculated as the number of rows times the number of columns. Thus, a 5 row by a 5 column feature map would include 5×5=25 total data elements ($X_{num\_elem}$). In various embodiments, the partitioning threshold $S_{thesh}$ may take on different values, such as 20%, 30%, 40%, 50%, 60%, and others.

On the other hand, if sparsity detector 302 determines that the sparsity of the feature map $S_{map}$ greater than or equal to a threshold, e.g., $S_{map} \geq S_{thresh}$, then sparsity detector 302 outputs row counts 304. As above, in various embodiments, the row counts 304 may include a count (number) of dense data elements or a count of sparse data elements. Split row detector 306 then determines a split row $n_{split}$ for the feature map based on the row counts 304.

In one embodiment, the split row $n_{split}$ is based on the row that approximately splits (and balances) the sparsity (and thus the density as well) between a first feature sub-map and a second feature sub-map created from the feature map. For example, the split row $n_{split}$ may be used to define a first subset of rows from the feature map for the first feature sub-map and a second subset of rows from the feature map for the second feature sub-map. Thus, if the entire feature map includes S sparse values, then the split row $n_{split}$ is the row that includes the S/2th sparse value counting sparse values cumulatively from the first row. Alternatively, if the entire feature map includes D dense values, then the split row $n_{split}$ is the row that includes the D/2th dense value counting dense values cumulatively from the first row.

Consider a simple example in which a feature map includes N=4 rows, the total number of sparse values in the N rows is S=12, the first row includes 4 sparse values, the second row includes 2 sparse values, the third row includes 3 sparse values, and the fourth row includes 3 sparse values. Then, the split row $n_{split}=2$ because $$\frac{S}{2} = 6$$

and the second row includes the 6th sparse value. In the case of an odd number of sparse values, a rounding operation may be performed. Such as, if S=13, then round $$\left(\frac{S}{2}\right) = 7,$$

and thus the row including the 7th sparse value would be the split row $n_{split}$.

Consider another example in which a feature map includes N=4 rows, the total number of dense values in the N rows is D=4, the first row includes 1 dense value, the second row includes 2 dense values, the third row includes 1 sparse values, and the fourth row includes 0 dense values. Then, the split row $n_{split}=2$ because $$\frac{D}{2} = 2$$

and the second row includes the 2nd dense value. In the case of an odd number of dense values, a rounding operation may be performed. Such as, if D=5, then round $$\left(\frac{5}{2}\right) = 3,$$

and thus the row including the 3rd dense value would be the split row $n_{split}$.

Once the split row $n_{split}$ is determined, then the feature sub-maps 308 can be created. For example, a first feature sub-map includes rows 1 to the split row $n_{split}$, and a second feature sub-map includes rows ($n_{split}$+1) to N. Thus, in the example above, the first feature sub-map would include rows 1 and 2, and the second feature sub-map would include rows 3 and 4.

Note that in some cases, a feature map may be split iteratively (as indicated by the broken line from feature sub-maps 308 to sparsity detector 302) in order to achieve a target number of feature sub-maps. For example, the target number of feature sub-maps may be based on a number of sparse tensor memory units and/or sparse tensor compute units in an accelerator (or available in accelerator), such as accelerator 200 of FIG. 2. For example, a single split of a feature map generates two feature sub-maps. Then one or both of those feature sub-maps may be split again to generate either 3 or 4 feature sub-maps, and so on. Thus, a target number feature sub-maps may be achieved to match a number of sparse tensor memory units and/or sparse tensor compute units (e.g., M) that are part of or available in an accelerator (e.g., accelerator 200 of FIG. 2). The target number of feature sub-maps may be provided to partitioning block 300 as an operational parameter (not depicted), or may be preconfigured, in various embodiments.

In some cases, the feature sub-maps may need additional configuration based on the downstream processing task. In one example, where the downstream processing task is a convolution operation, one feature sub-map of a pair of feature sub-maps created by a portioning operation may have additional rows added to generate a row overlap between the feature sub-maps, which may be useful to avoid segmentation issues when a convolution kernel (or filter) is applied to the individual feature sub-maps in a downstream processing operation. Accordingly, in some embodiments, a task type indication (e.g., a task parameter) may be provided to partitioning block 300 in order to enable a row overlapping function 310. Further, a weight matrix (or kernel or filter) size indication (e.g., a weight matrix size parameter) may be provided in order that a number of overlapping rows can be determined. For example, where a weight matrix is sized 3×3, thus K=3 in this example, then K−1 rows may be added to one feature sub-map of a pair of feature sub-maps generated from a feature map so that each feature sub-map has overlapping rows. Note that this operation may unbalance the sparsity between the feature sub-maps, but the tradeoff in convolution performance and reduced overhead may make that effect nevertheless worthwhile.

Ultimately, the partitioned feature sub-maps are provided for downstream processing, such as provided to STMC 250 and then STCC 230 for parallel processing, as described above with respect to FIG. 2.

Further examples of determining split rows, including with added row overlap, are depicted and described with respect to FIGS. 10, 11, and 12, below.

Note that while FIG. 3 has discussed row-wise split examples, it is also possible to implement a column-wise split approach using column-wise counts of sparse and/or dense data elements. Such an approach may be useful for feature maps with large number of columns. Nevertheless, row-wise splitting may be advantageous for certain downstream operations, such as convolutions, since 2D convolutions are performed in a row direction first and then in a column direction.

Example Sparse Tensor Memory Cluster

Figure 4:
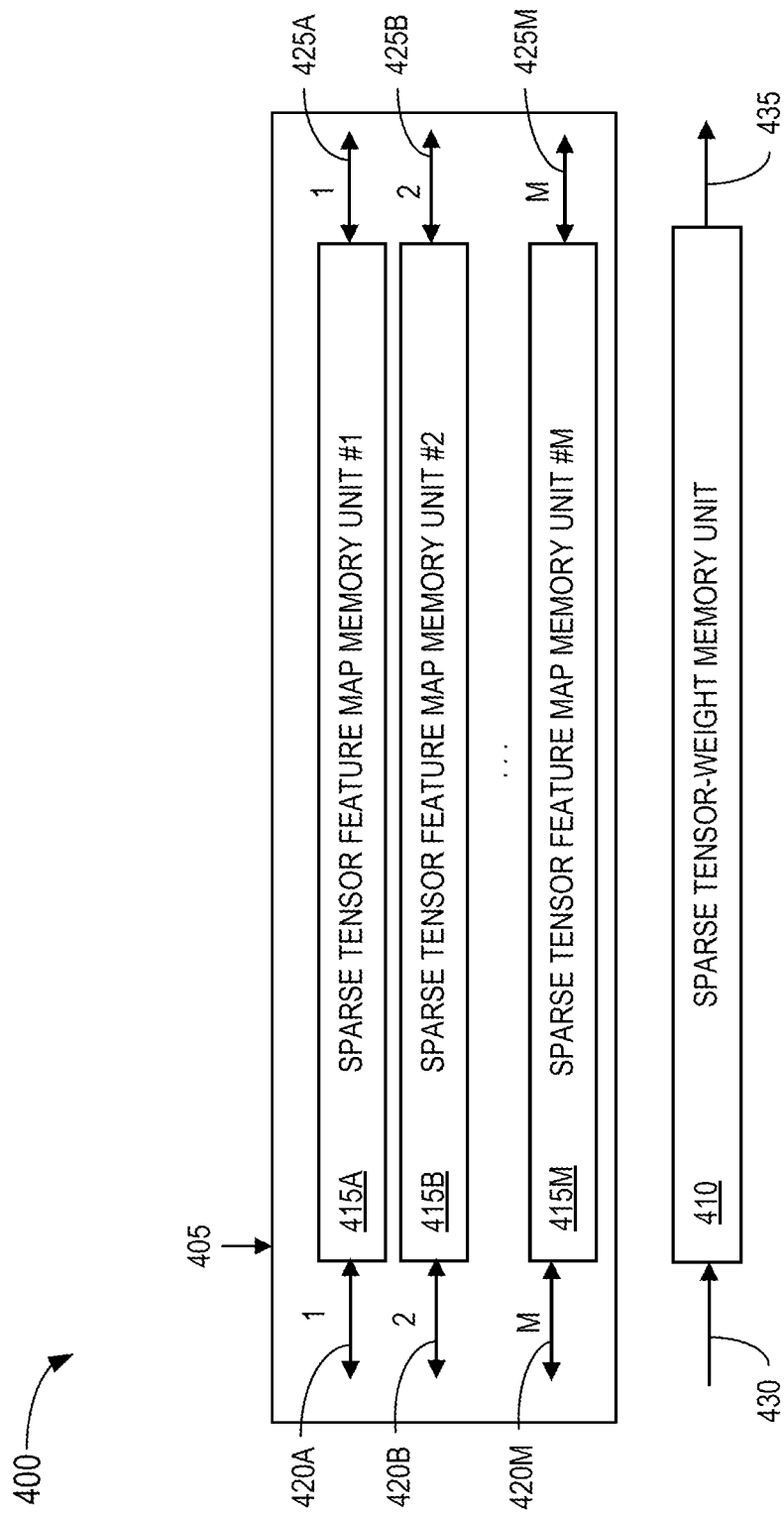
FIG. 4 is an example block diagram of a sparse tensor memory cluster of the accelerator of FIG. 2, in accordance with some embodiments of the present disclosure.

FIG. 4 depicts an example of a sparse tensor memory cluster 400, in accordance with some embodiments of the present disclosure. The sparse tensor memory cluster 400 is an example of the sparse tensor memory cluster 250 of FIG. 2.

The sparse tensor memory cluster 400 includes a sparse tensor feature map memory 405 and a sparse tensor weight memory 410. The sparse tensor feature map memory 405 is configured to store the feature sub-maps received from DRAM 215 via the direct memory access controller 245 or from partitioning block 210 of FIG. 2. The sparse tensor feature map memory 405 is also configured to store the various outputs received from the sparse tensor compute cluster 230. The sparse tensor feature map memory 405 includes a plurality of sparse tensor feature map memory units 415A-415M. The number of the plurality of sparse tensor feature map memory units 415A-415M may be dependent upon a designated number of feature sub-maps that may be desired to be processed in parallel. Each of the plurality of sparse tensor feature map memory units 415A-415M is independent from other sparse tensor feature map memory units and may be configured to store at least one feature sub-map independent from other sparse tensor feature map memory units.

Thus, in some embodiments, the plurality of sparse tensor feature map memory units 415A-415M are not configured to share the data stored therein with other ones of the plurality of sparse tensor feature map memory units. Further, each of the plurality of sparse tensor feature map memory units 415A-415M is configured to send the feature sub-map stored therein to a corresponding one of a sparse tensor compute unit of the sparse tensor compute cluster (e.g., the sparse tensor compute cluster 230 of FIG. 2). For example, in some embodiments, the sparse tensor feature map memory unit #i may be configured to send the input tensor stored therein to the sparse tensor compute unit #i, as discussed further below. Such one-to-one correspondence between a particular sparse tensor feature map memory unit and a sparse tensor compute unit is referred to herein as "static binding." Thus, in some embodiments, the number of sparse tensor feature map memory units 415A-415M in the sparse tensor feature map memory 405 is same as the number of sparse tensor compute units in the sparse tensor compute cluster (e.g., the sparse tensor compute cluster 230 of FIG. 2).

Further, each of the plurality of sparse tensor feature map memory units 415A-415M may be connected via a bidirectional bus 420A-420M, respectively, to receive feature sub-maps from, for example, partitioning block 210 of FIG. 2, as well as to send outputs received from the sparse tensor compute cluster 230 back partitioning block 210 or directly to DRAM 215 via the direct memory access controller 245 of FIG. 2. Similarly, each of the plurality of sparse tensor feature map memory units 415A-415M may be connected via a bidirectional bus 425A-425M, respectively, to an associated one of the sparse tensor compute unit of the sparse tensor compute cluster (e.g., the sparse tensor compute cluster 230 of FIG. 2) to send the feature sub-maps stored therein to the sparse tensor compute cluster and to receive outputs back from the sparse tensor compute cluster.

Thus, for example, the sparse tensor feature map memory unit 415A may receive a feature sub-map from DRAM 215 via the direct memory access controller 245 or from partitioning block 210 of FIG. 2 via the bus 420A for storing, and send that feature sub-map to an associated one of the sparse tensor compute unit of the sparse tensor compute cluster (e.g., the sparse tensor compute cluster 230 of FIG. 2) for processing via the bus 425A. Similarly, the sparse tensor feature map memory unit 415A may receive the output (e.g., the result from processing the feature sub-map) from the sparse tensor compute cluster (e.g., the sparse tensor compute cluster 230 of FIG. 2) via the bus 425A for storing, and send that output to partitioning block 210 or to DRAM 215 via the direct memory access controller 245 of FIG. 2 via the bus 420A. The sparse tensor feature map memory units 415B-415M may function similar to the sparse tensor feature map memory unit 415A.

In some embodiments, each of the plurality of sparse tensor feature map memory units 415A-415M may also be configured to store index values of the feature sub-map that is stored therein. In addition to receiving a feature sub-map, each of the plurality of sparse tensor feature map memory units 415A-415M may also receive the index values associated with the feature sub-map from DRAM 215 via the direct memory access controller 245 or from partitioning block 210 of FIG. 2. For example, if the sparse tensor feature map memory units 415A receives feature sub-map A from DRAM 215 or the partitioning block 210 of FIG. 2, that sparse tensor feature map memory unit may also receive the index values corresponding to the feature sub-map A. The sparse tensor feature map memory units 415A may then send the index values of the feature sub-map A to the sparse tensor compute cluster (e.g., the sparse tensor compute cluster 230 of FIG. 2) along with sending the feature sub-map A. The index values capture the row numbers and column numbers of a particular feature sub-map in the feature map. For example, an index value (X, Y) refers to the row number X and column number Y of the feature sub-map in the feature map.

The sparse tensor weight memory 410 may be configured to store the weights that are to be applied to the feature sub-maps stored within the sparse tensor feature map memory units 415A-415M. Thus, the sparse tensor weight memory 410 may be connected via a unidirectional bus 430 to DRAM 215 via the direct memory access controller 245 of FIG. 2 (as depicted by the partitioning block bypass 247 in FIG. 2) to receive the weights and via a bus 435 to the sparse tensor compute cluster (e.g., the sparse tensor compute cluster 230 of FIG. 2) for sending the weights to the sparse tensor compute cluster. Since the sparse tensor weight memory 410 does not need to receive any results back from the sparse tensor compute cluster and does not need to send any results back to the partitioning block 210 or DRAM 215 of FIG. 2, the bus 430 and the bus 435 may be unidirectional buses configured to send data in a single direction. In other embodiments, the bus 430 and/or the bus 435 may be bidirectional similar to the bidirectional bus 420A-420M/the bidirectional bus 425A-425M.

Example Sparse Tensor Memory Cluster

Figure 5:
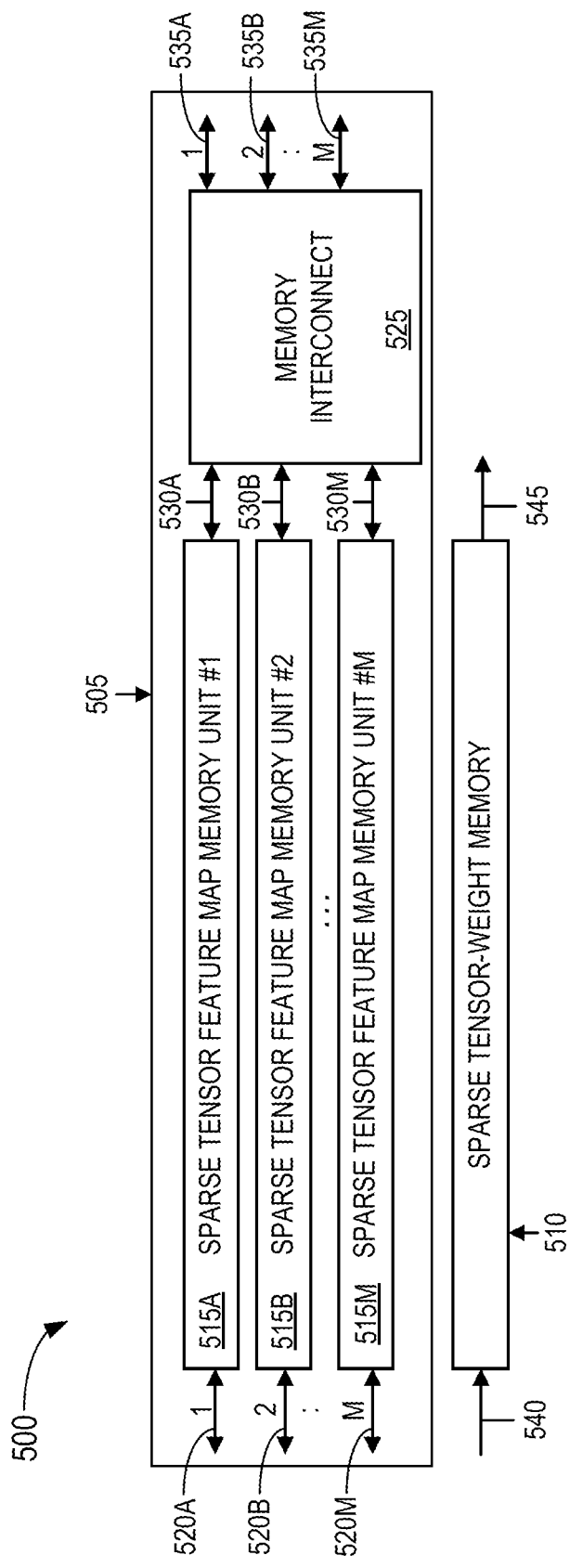
FIG. 5 is another example block diagram of the sparse tensor memory cluster of the accelerator of FIG. 2, in accordance with some embodiments of the present disclosure.

FIG. 5 depicts an example of a sparse tensor memory cluster 500, in accordance with some embodiments of the present disclosure. The sparse tensor memory cluster 500 is analogous to the sparse tensor memory cluster 250 of FIG. 2.

Sparse tensor memory cluster 500 is similar to the sparse tensor memory cluster 400 of FIG. 4 in many aspects. For example, similar to the sparse tensor memory cluster 400, the sparse tensor memory cluster 500 includes a sparse tensor feature map memory 505 and a sparse tensor weight memory 510. Also similar to the sparse tensor feature map memory 405, the sparse tensor feature map memory 505 includes a plurality of sparse tensor feature map memory units 515A-515M connected via a bidirectional bus 520A-520M to the partitioning block 210 of FIG. 2. However, unlike the sparse tensor feature map memory 405 (in which each of the plurality of sparse tensor feature map memory units 415A-415M is independent, does not share the data stored therein with other ones of the plurality of sparse tensor feature map memory units 415A-415M, and sends the data stored therein to the corresponding one of the sparse tensor compute units), the plurality of sparse tensor feature map memory units 515A-515M of the sparse tensor feature map memory 505 are interconnected to one another and to other sparse tensor compute units via a memory interconnect 525.

Further, in some embodiments, the memory interconnect 525 may be configured to override the static binding discussed above with respect to FIG. 4. For example, in some embodiments, the memory interconnect 525 may enable a sparse tensor feature map memory unit #i to communicate with sparse tensor compute unit #1–M (where M is the number of the sparse tensor compute units in the associated sparse tensor compute cluster) depending upon the configuration of the memory interconnect. In some embodiments, the memory interconnect 525 may be a two-by-two switch that enables a sparse tensor feature map memory unit #i to communicate with the sparse tensor compute unit #i or sparse tensor compute unit #i+1. In other embodiments, the memory interconnect 525 may be a multi-stage interconnect, such as a mesh network or Benes Network, that allows a sparse tensor feature map memory unit #i to communicate with each of the sparse tensor compute units #1–M. In yet other embodiments, the memory interconnect 525 may be configured in other ways to allow a sparse tensor feature map memory unit #i to communicate with one or more sparse tensor compute units in addition to the sparse tensor compute unit #i. Similarly, in some embodiments, the memory interconnect 525 may enable a particular one of the plurality of sparse tensor feature map memory units 515A-515M to be interconnected with one or more of the other ones of the plurality of sparse tensor feature map memory units. For example, depending upon the configuration of the memory interconnect 525, a sparse tensor feature map memory unit #i may be interconnected with one or more of the sparse tensor feature map memory units #(i+1)–M.

Each of the plurality of sparse tensor feature map memory units 515A-515M may be connected to the memory interconnect 525 via bidirectional bus 530A-530M. Thus, each of the plurality of sparse tensor feature map memory units 515A-515M may be configured to send the feature sub-map (and corresponding index values) stored therein to the memory interconnect 525 and to receive a feature sub-map (e.g., that is stored in another sparse tensor feature map memory unit) or an output from the memory interconnect via their respective one of the bidirectional bus 530A-530M. Similarly, the memory interconnect 525 may be connected to the sparse tensor compute cluster (e.g., the sparse tensor compute cluster 230 of FIG. 2) via bidirectional bus 535A-

535M to send feature sub-maps (and the index values) to and receive outputs from the sparse tensor compute cluster. By using the memory interconnect 525, the flexibility in storing information within the plurality of sparse tensor feature map memory units 515A-515M may be increased and the dynamic binding of the sparse tensor memory cluster may be enabled.

The sparse tensor weight memory 510 is similarly configured as the sparse tensor weight memory 410 of FIG. 4. Thus, the sparse tensor weight memory 510 may be configured to store the weights that are to be applied to the feature sub-maps stored within the sparse tensor feature map memory units 515A-515M. Further, the sparse tensor weight memory 510 may be connected via a unidirectional bus 540 to DRAM 215 via the direct memory access controller 245 (e.g., via partitioning block bypass 247) of FIG. 2 to receive the weights and via a bus 545 to the sparse tensor compute cluster (e.g., the sparse tensor compute cluster 230 of FIG. 2) for sending the weights to the sparse tensor compute cluster. In other embodiments, the bus 540 and/or the bus 545 may be bidirectional.

Example Sparse Tensor Feature Map Memory Unit

Figure 6:
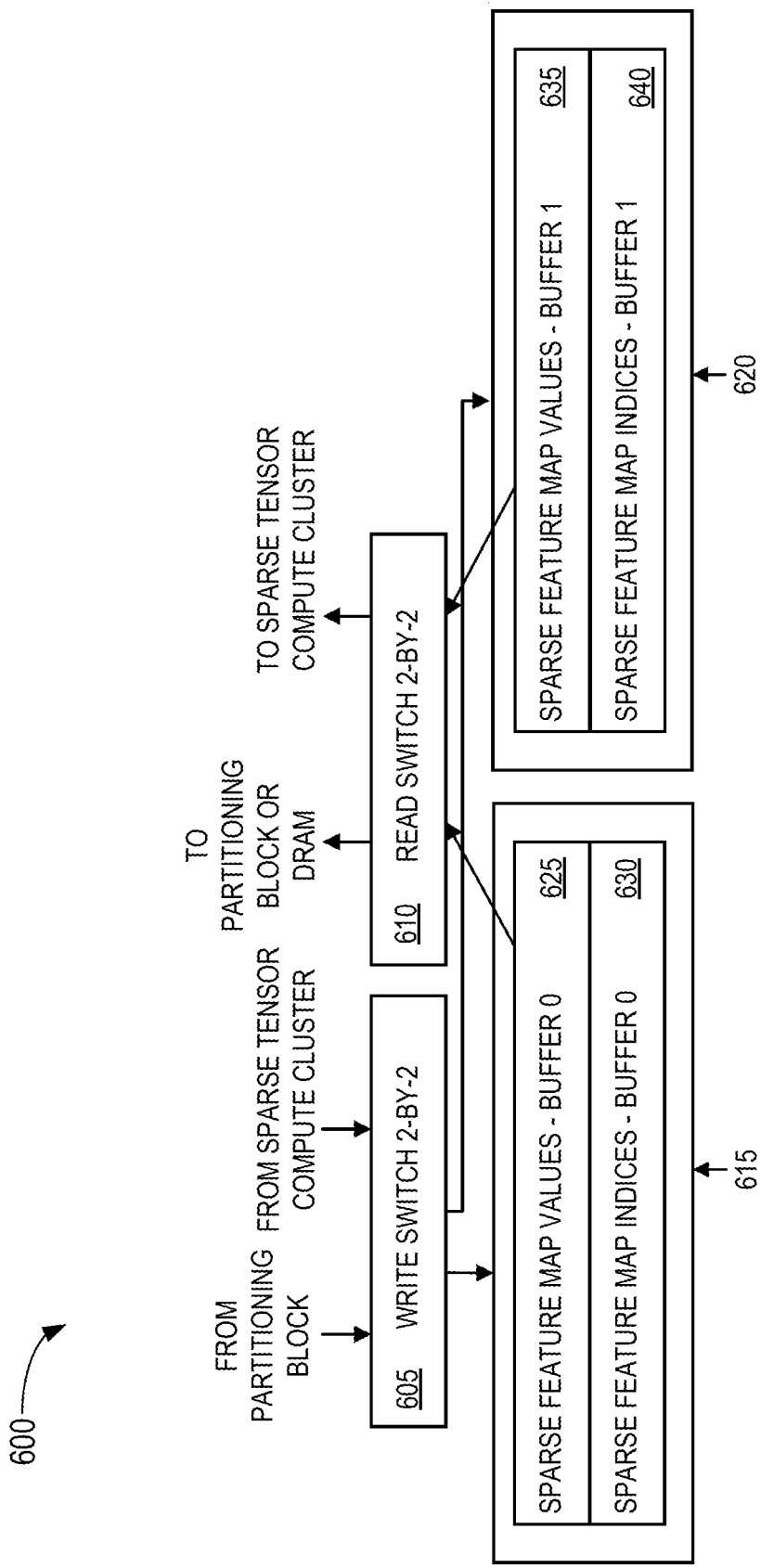
FIG. 6 is an example block diagram of a sparse tensor feature map memory unit of the sparse tensor memory clusters of FIGS. 4 and 5, in accordance with some embodiments of the present disclosure.

FIG. 6 depicts an example sparse tensor feature map memory unit 600, in accordance with some embodiments of the present disclosure. The sparse tensor feature map memory unit 600 may be analogous to each of the plurality of sparse tensor feature map memory units 415A-415M and the plurality of sparse tensor feature map memory units 515A-515M described above with respect to FIGS. 4 and 5, respectively.

In this example, the sparse tensor feature map memory unit 600 includes a write switch 605, a read switch 610, a first set of buffers 615, and a second set of buffers 620. The write switch 605 is configured to write the feature sub-maps received from the partitioning block 210 of FIG. 2 (or from another sparse tensor feature map memory unit if interconnected) to the first set of buffers 615 and/or the second set of buffers 620. The write switch 605 is also configured to write the outputs (e.g., the output feature sub-maps) received from the sparse tensor compute cluster (e.g., the sparse tensor compute cluster 230 of FIG. 2) to the first set of buffers 615 and/or the second set of buffers 620. In some embodiments, the write switch 605 may be a 2×2 switch configured for double buffering control to receive data from two sources and write data to two sets of buffers (e.g., the first set of buffers 615 and the second set of buffers 620). In other embodiments, the write switch 605 may be configured in other ways.

The read switch 610 may be configured to read data stored within the first set of buffers 615 and the second set of buffers 620. For example, the read switch 610 may read data written by the write switch 605 in the first set of buffers 615 and/or the second set of buffers 620 to send the read data to the partitioning block 210 or to DRAM 215 via DRAM and DMA controller 245 of FIG. 2 (e.g., via the direct memory access controller 245 of FIG. 2). Similarly, the read switch 610 may read data written by the write switch 605 in the first set of buffers 615 and/or the second set of buffers 620 to send the read data to the sparse tensor compute cluster (and particularly the sparse tensor compute unit) of the sparse tensor compute cluster that is associated with the sparse tensor feature map memory unit 600. For example, the write switch 605 may receive a feature sub-map (and corresponding index values) from the partitioning block 210 of FIG. 2 and store the feature sub-map (and the index values) within the first set of buffers 615 and/or the second set of buffers 620. The read switch 610 may then read that feature sub-map (and the index values) from the first set of buffers 615 and/or the second set of buffers 620 and send the read data to the sparse tensor compute cluster. Similarly, the write switch 605 may receive an output feature sub-map from the sparse tensor compute cluster and write that output feature sub-map within the first set of buffers 615 and/or the second set of buffers 620. The read switch 610 may read that output from the first set of buffers 615 and/or the second set of buffers 620 and transmit that output tensor to the partitioning block 210 or to DRAM 215 via DRAM and DMA controller 245 of FIG. 2.

In some embodiments, the read switch 610 may also be 2×2 switch configured for double buffering control to read data from two sets of buffers (e.g., the first set of buffers 615 and the second set of buffers 620). In other embodiments, the read switch 610 may be a 1×1 switch configured to read data from a single set of buffers or the read switch may be configured to read data from more than two sets of buffers.

Each of the first set of buffers 615 and the second set of buffers 620 may include two buffers in some embodiments. For example, in some embodiments, the first set of buffers 615 may include a first value buffer 625 and a first indices buffer 630. Similarly, in some embodiments, the second set of buffers 620 may include a second value buffer 635 and a second indices buffer 640. Although only two sets of buffers (e.g., the first set of buffers 615 and the second set of buffers 620) are shown in the sparse tensor feature map memory unit 600, in other embodiments, a single set of buffers or greater than two sets of buffers may be provided depending upon the configuration of the write switch 605 and/or the read switch 610. Similarly, although each of the first set of buffers 615 and the second set of buffers 620 is shown to have two buffers each, in other embodiments, either or both of the first set of buffers and the second set of buffers may include greater than two buffers or possibly a single buffer each.

The first value buffer 625 and the second value buffer 635 may be configured to store data values of the feature sub-map or the output feature sub-map, while the first indices buffer 630 and the second indices buffer 640 may be configured to store the index values of the feature sub-maps or the output feature sub-maps. For example, in some embodiments, the data values of feature sub-map A may be stored within the first value buffer 625 and the index values of that feature sub-map may be stored within the first indices buffer 630. In other embodiments, the data values of a particular feature sub-map (or the output feature sub-map) may be stored within one of the first set of buffers 615 or the second set of buffers 620 and the index values of that particular feature sub-map (or output feature sub-map) may be stored within the other one of the first set of buffers or the second set of buffers. Further, in some embodiments, the first set of buffers 615 may be designated to store the data values and the index values of the feature sub-maps, while the second set of buffers may be configured to store the data values and index values of the output feature sub-maps.

In other embodiments, each of the first set of buffers 615 and the second set of buffers 620 may store both the feature sub-maps and the output feature sub-maps (and their corresponding index values). Thus, each feature sub-map and each output feature sub-map may be associated with two buffers, including a value buffer (e.g., the first value buffer 625, the second value buffer 635) to store the data values of the feature sub-map or the output feature sub-map and an indices buffer (e.g., the first indices buffer 630, the second indices buffer 640) to store the index values of that feature sub-map or the output feature sub-map.

Additionally, although the data values and the index values of a particular feature sub-map or the output feature sub-map are shown as being stored in separate buffers (e.g., the first value buffer 625, the second value buffer 635, the first indices buffer 630, the second indices buffer 640 in this example), in some embodiments, the data values and the index values of a particular feature sub-map or the output feature sub-map may be stored within a single buffer. In other words, in some embodiments, the first value buffer 625 and the first indices buffer 630 may be merged together to form a single buffer. Similarly, in some embodiments, the second value buffer 635 and the second indices buffer 640 may be merged together to form a single buffer. Other arrangements are possible.

In some embodiments, each buffer in the first set of buffers 615 and the second set of buffers 620 may be an SRAM memory configured as a single port read/write register file, a first-in-first-out data structure, a set of registers, or the like. By using SRAM memory for the buffers in the first set of buffers 615 and the second set of buffers 620, complex and more expensive cache structures may be avoided. In other embodiments, one or more buffers in the first set of buffers 615 and/or the second set of buffers 620 may be other types of memories. Further, each buffer in the first set of buffers 615 and the second set of buffers 620 may be configured with a particular size to be able to accommodate the data values and index values of at least one feature sub-map or at least one output feature sub-map.

Example Sparse Tensor Weight Memory

Figure 7:
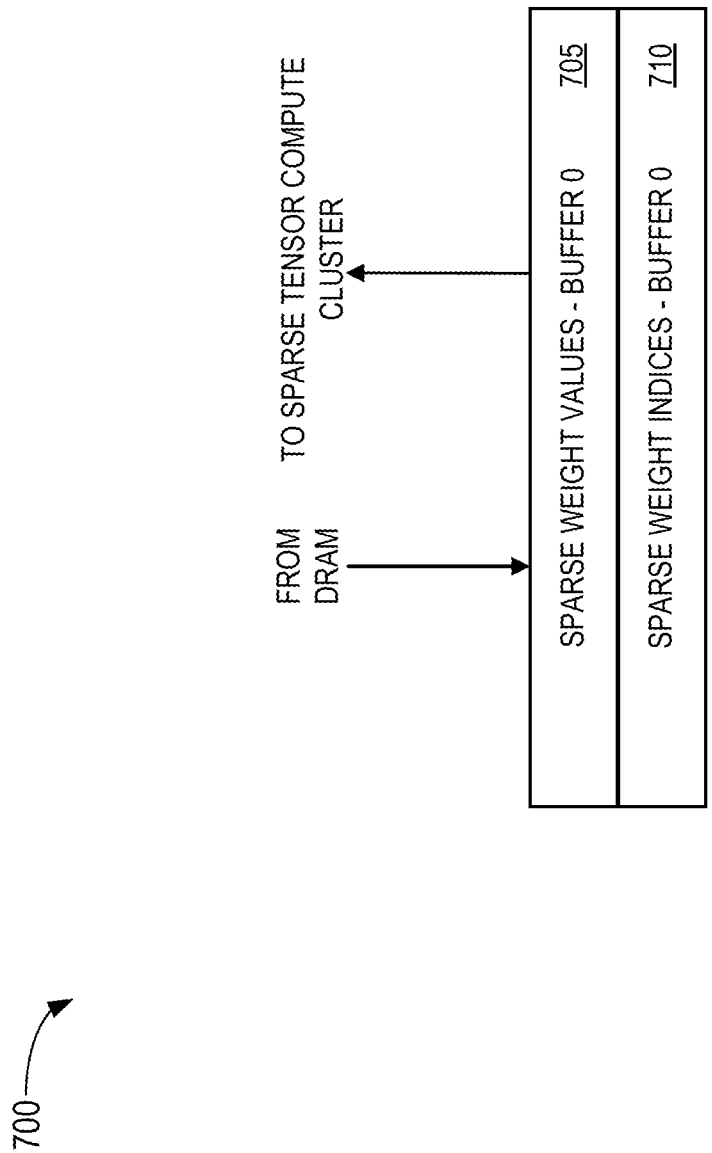
FIG. 7 is an example block diagram of a sparse tensor weight memory of the sparse tensor memory clusters of FIGS. 4 and 5, in accordance with some embodiments of the present disclosure.

FIG. 7 depicts an example sparse tensor weight memory 700, in accordance with some embodiments of the present disclosure. The sparse tensor weight memory 700 is analogous to the sparse tensor weight memory 410 and the sparse tensor weight memory 510 of FIGS. 4 and 5, respectively.

In this example, the sparse tensor weight memory 700 includes a first buffer 705 configured to store the weight values and a second buffer 710 to store the index values of the weight values from, for example, the weight matrix 220 of FIG. 2. Thus, the first buffer 705 is similar to the first value buffer 625 and the second value buffer 635 of FIG. 6, while the second buffer 710 is similar to the first indices buffer 630 and the second indices buffer 640 of FIG. 6. The first buffer 705 and the second buffer 710 may receive and store weight values/index values from DRAM 215 of FIG. 2 (e.g., via partitioning block bypass 247) and send those values to the sparse tensor compute cluster (e.g., the sparse tensor compute cluster 230 of FIG. 2). In some embodiments, greater than one buffer for storing the weight values and/or greater than one buffer for storing the index values of the weight matrix may be used.

Figure 8:
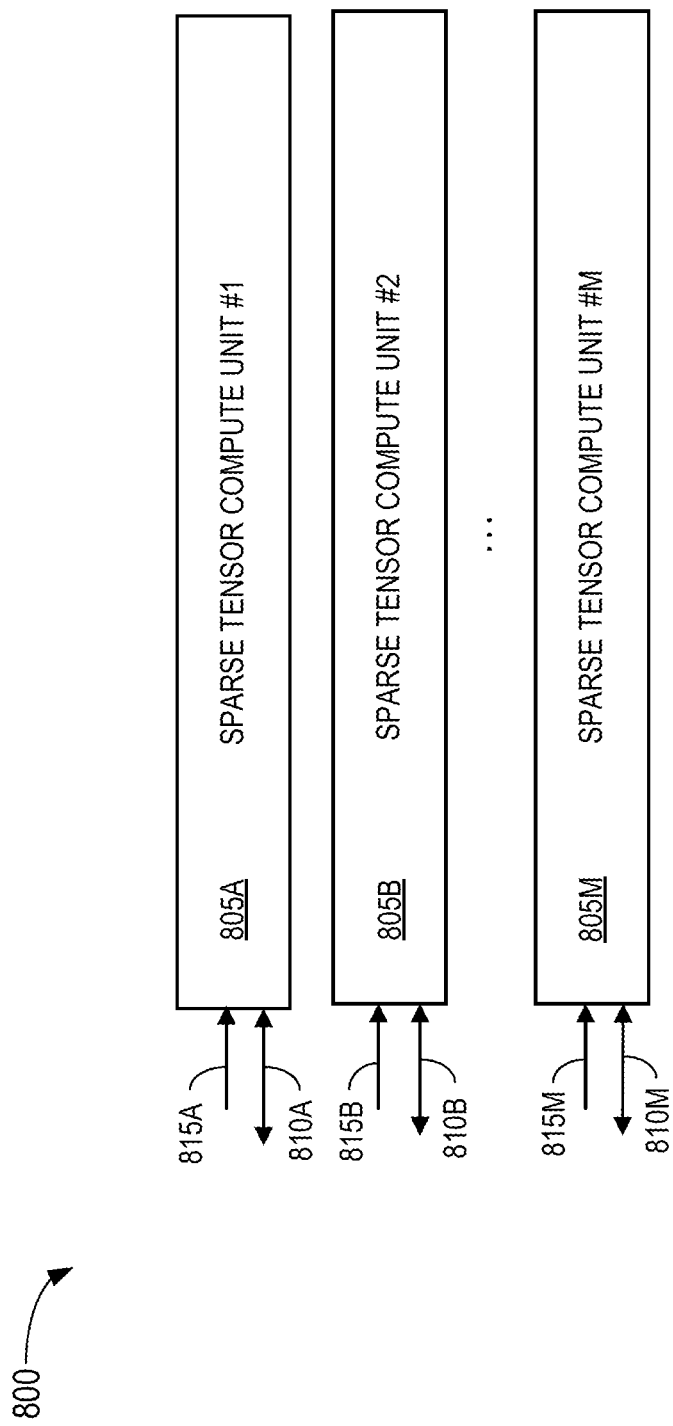
FIG. 8 is an example block diagram of a sparse tensor compute cluster of the accelerator of FIG. 2, in accordance with some embodiments of the present disclosure.

FIG. 8 depicts an example sparse tensor compute cluster 800, in accordance with some embodiments of the present disclosure. The sparse tensor compute cluster 800 is analogous to the sparse tensor compute cluster 230 of FIG. 2.

In this example, the sparse tensor compute cluster 800 includes a plurality of sparse tensor compute units 805A-805M. The number of the plurality of sparse tensor compute units 805A-805M may be dependent upon a designated number of feature sub-maps that may be desired to be processed in parallel. For example, to process five feature sub-maps in parallel, five sparse tensor compute units may be provided, with each sparse tensor compute unit being configured to process one feature sub-map at a time. In some embodiments, the number of the plurality of sparse tensor compute units 805A-805M is same as the number of the plurality of sparse tensor feature map memory units 415A-415M or 515A-515M of FIGS. 4 and 5, respectively, with a sparse tensor compute unit #i being associated with sparse tensor feature map memory unit #i. In other embodiments, different numbers of the plurality of sparse tensor compute units 805A-805M and the plurality of sparse tensor feature map memory units 415A-415M or 515A-515M of FIGS. 4 and 5, respectively, may be used.

Further, in some embodiments, each of the plurality of sparse tensor compute units 805A-805M may be independent from other sparse tensor compute units, and process data independent from other ones of the plurality of sparse tensor compute units. Each of the plurality of sparse tensor compute units 805A-805M receives a feature sub-map (and corresponding index values) from the plurality of sparse tensor feature map memory units 415A-415M or 515A-515M of FIGS. 4 and 5, respectively, via a bidirectional bus link 810A-810M, respectively. The bidirectional bus 810A-810M may also be used to send the output feature sub-maps back to the plurality of sparse tensor feature map memory units 415A-415M or 515A-515M of FIGS. 4 and 5, respectively.

For example, if the sparse tensor memory cluster 400 of FIG. 4 having the static binding is used, in some embodiments, the sparse tensor compute unit #i may be configured to receive the feature sub-map (and corresponding index values) stored within the sparse tensor feature map memory unit #i via the bidirectional bus #i. In such embodiments, the sparse tensor compute unit #i may also be configured to send the output feature sub-map to the sparse tensor feature map memory unit #i via the bidirectional bus #i. Thus, a one-to-one correspondence between a particular sparse tensor compute unit and a sparse tensor feature map memory unit exists. For example, during static binding, the sparse tensor compute unit 805A may receive a feature sub-map (and corresponding index values) from the sparse tensor feature map memory unit 415A of FIG. 4 via the bidirectional bus link 810A, and send the resulting output feature sub-map back to the sparse tensor feature map memory unit 415A of FIG. 4 via the bidirectional bus 810A.

In other embodiments, if the sparse tensor memory cluster 500 of FIG. 5 is used, a sparse tensor compute unit #i may still be associated with sparse tensor feature map memory unit #i. However, depending upon the configuration of the memory interconnect 525 of FIG. 5, a sparse tensor compute unit #i may receive a feature sub-map from a sparse tensor feature map memory unit #(i+1)–M via the bidirectional bus 810A-810M. Further, depending upon the configuration of the memory interconnect 525 of FIG. 5, a sparse tensor compute unit #i may be able to send the output feature sub-map to a sparse tensor feature map memory unit #(i+1)–M in addition to the sparse tensor feature map memory unit #i.

In addition to the feature sub-maps, each of the plurality of sparse tensor compute units 805A-805M receives weight values (and corresponding index values) via a unidirectional bus 815A-815M from the sparse tensor weight memory 410 of FIG. 4 or the sparse tensor weight memory 510 of FIG. 5. In some embodiments, the same weight may be transmitted to each, or at least a group, of the plurality of sparse tensor compute units 805A-805M via the unidirectional bus 815A-815M. In other embodiments, different weights may be transmitted to each, or at least a group, of the plurality of sparse tensor compute units 805A-805M via the unidirectional bus 815A-815M. Further, in some embodiments, a single weight may be transmitted to the plurality of sparse tensor compute units 805A-805M at a time, while in other embodiments, more than one weight may be simultaneously transmitted to one or more of the plurality of sparse tensor compute units at a time.

The output feature sub-maps obtained from processing a feature sub-map may be transmitted back to the corresponding one of the sparse tensor feature map memory unit. For example, in some embodiments, the sparse tensor compute unit 805A may receive a feature sub-map from the sparse tensor feature map memory unit 415A or 515A and then process the feature sub-map to obtain an output feature sub-map, and send the output feature sub-map back to the sparse tensor feature map memory unit 415A or 515A, of FIG. 4 or 5, respectively. The sparse tensor feature map memory unit 415A or 515A, of FIG. 4 or 5, respectively, may then send the output feature sub-map to DRAM 215 of FIG. 2, to another sparse tensor feature map memory unit, and/or to another sparse tensor compute unit based upon the configuration.

Example Sparse Tensor Compute Cluster

Figure 9:
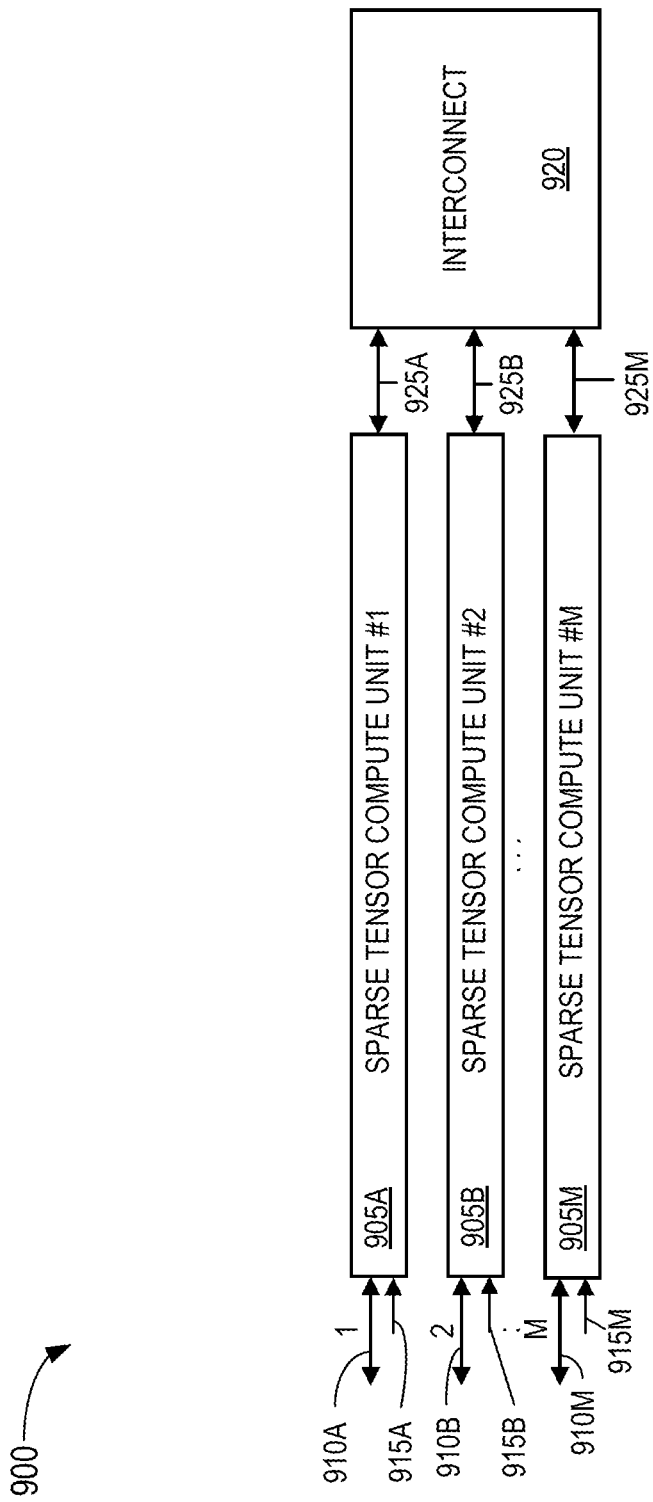
FIG. 9 is another example block diagram of the sparse tensor compute cluster of the accelerator of FIG. 2, in accordance with some embodiments of the present disclosure.

FIG. 9 depicts an example sparse tensor compute cluster 900, in accordance with some embodiments of the present disclosure. The sparse tensor compute cluster 900 is analogous to the sparse tensor compute cluster 230 of FIG. 2. The sparse tensor compute cluster 900 may also be substantially similar to the sparse tensor compute cluster 800 of FIG. 8. For example, similar to the sparse tensor compute cluster 800 of FIG. 8, the sparse tensor compute cluster 900 includes a plurality of sparse tensor compute units 905A-905M connected via a bidirectional bus 910A-910M to at least one of the sparse tensor feature map memory units 415A-415M or 515A-515M, of FIG. 4 or 5, respectively, as discussed above. Also similar to the sparse tensor compute cluster 800, each of the plurality of sparse tensor compute units 905A-905M is connected via a unidirectional bus 915A-915M to the sparse tensor weight memory 410 or 510 of FIG. 4 or 5, respectively, to receive the weights.

However, unlike the sparse tensor compute cluster 800 of FIG. 8 in which each of the plurality of sparse tensor compute units 805A-805M is independent and does not share the data being processed therein with other ones of the plurality of sparse tensor compute units, the plurality of sparse tensor compute units 905A-905M of the sparse tensor compute cluster 900 are interconnected via an interconnect 920. The interconnect 920 may enable dynamic binding instead of the static binding discussed above. Thus, in some embodiments, the interconnect 920 may enable a sparse tensor compute unit #i to communicate with other ones of the sparse tensor compute units #1–M depending upon the configuration of the interconnect 920. For example, in some embodiments, the interconnect 920 may be a 2×2 switch that enables a sparse tensor compute unit #i to communicate with the sparse tensor compute unit #i+1. In other embodiments, the interconnect 920 may be a multi-stage interconnect, such as a mesh network or Benes Network, that allows a sparse tensor compute unit #i to communicate with each of the other sparse tensor compute units #1–M.

Each of the plurality of sparse tensor compute units 905A-905M may be connected to the interconnect 920 via a bidirectional bus 925A-925M. Thus, each of the plurality of sparse tensor compute units 905A-905M may be configured to send the output feature sub-map resulting from processing a particular feature sub-map directly to another one of the plurality of sparse tensor compute units via the interconnect 920 and the bidirectional bus 925A-925M instead of first sending those results to the sparse tensor memory cluster 400 or 500 of FIGS. 4 and 5, respectively. By using the interconnect 920, the flexibility in assigning and processing feature sub-maps may be increased.

Examples of Splitting Feature Maps for Sparsity Balancing

Figure 10:
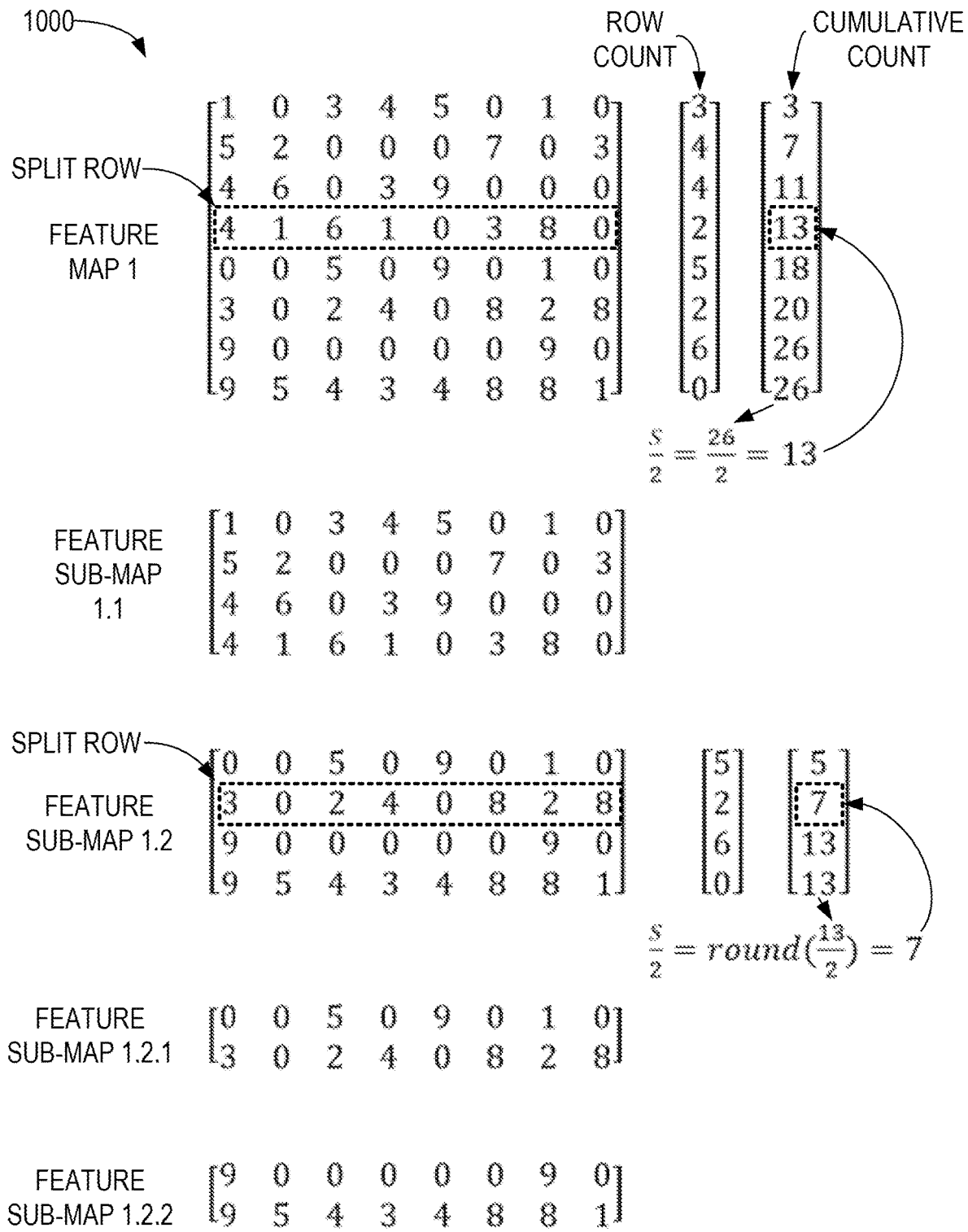
FIG. 10 depict an example of dividing feature maps into one or more feature sub-maps or input tensors in a partitioning block, in accordance with some embodiments of the present disclosure.

FIG. 10 depict an examples 1000 of dividing a feature map into feature sub-maps based on row-wise counts of sparse data elements, in accordance with some embodiments of the present disclosure.

In the depicted example 1000, feature map 1 is an 8×8 input data matrix that includes sparse (zero-valued) elements. Because there are eight rows, N=8. As explained above, a sparsity detector (e.g., 302) in a partitioning block (e.g., 300 of FIG. 3) may determine the number of sparse data elements in each row, which is depicted in the "Row Count" column (which is an example of the row counts 304 in FIG. 3). Further, a cumulative sparse data element count is depicted in the "Cumulative Count" column. In this example, the number of sparse data elements (S) in feature map 1 is 26, and $$\frac{S}{2} = 13.$$

Looking at the cumulative count column, the 13th sparse data element is found in the fourth row (as indicated by the rectangles with broken lines). Thus, the fourth row becomes the split row ($n_{split}$).

Based on the identified split row, two feature sub-maps, 1.1 and 1.2) may be generated. As can be seen. The dimensions of each sub-map in this example are Rows(1: $n_{split}$)×Columns(8), and Rows($n_{split}$+1:N)×Columns(8), and $n_{split}$ is defined as the row having the $$\frac{S}{2},$$

th sparse data element.

As described above, feature map 1 may be partitioned a number of times (e.g., iteratively) in order to get to a target number of feature sub-maps. Consider the example in which the target number of feature sub-maps was 3 (e.g., based on an availability of 3 STMCs and STCCs), then one of the feature sub-maps from the first partitioning iteration can be further partitioned. Accordingly, in the example, feature sub-map 1.2 is further partitioned into feature sub-maps 1.2.1 and 1.2.2 according to the same method described with respect to the first split. Note in this second split, a rounding operation is used because $$\frac{S}{2}$$

does not give an integer value. The round operation may be configured with a threshold, and in this case $$\frac{S}{2} = 6.5,$$

which rounds to 7. If, however, the round operation was configured to take, for example, the base integer value without the remainder, then 6 would be used and $n_{split}$ would remain the same, because the second row of feature sub-map 1.2 includes the 6th sparse data element. However, in other examples, a change in the rounding function may change the row that is selected.

Figure 11:
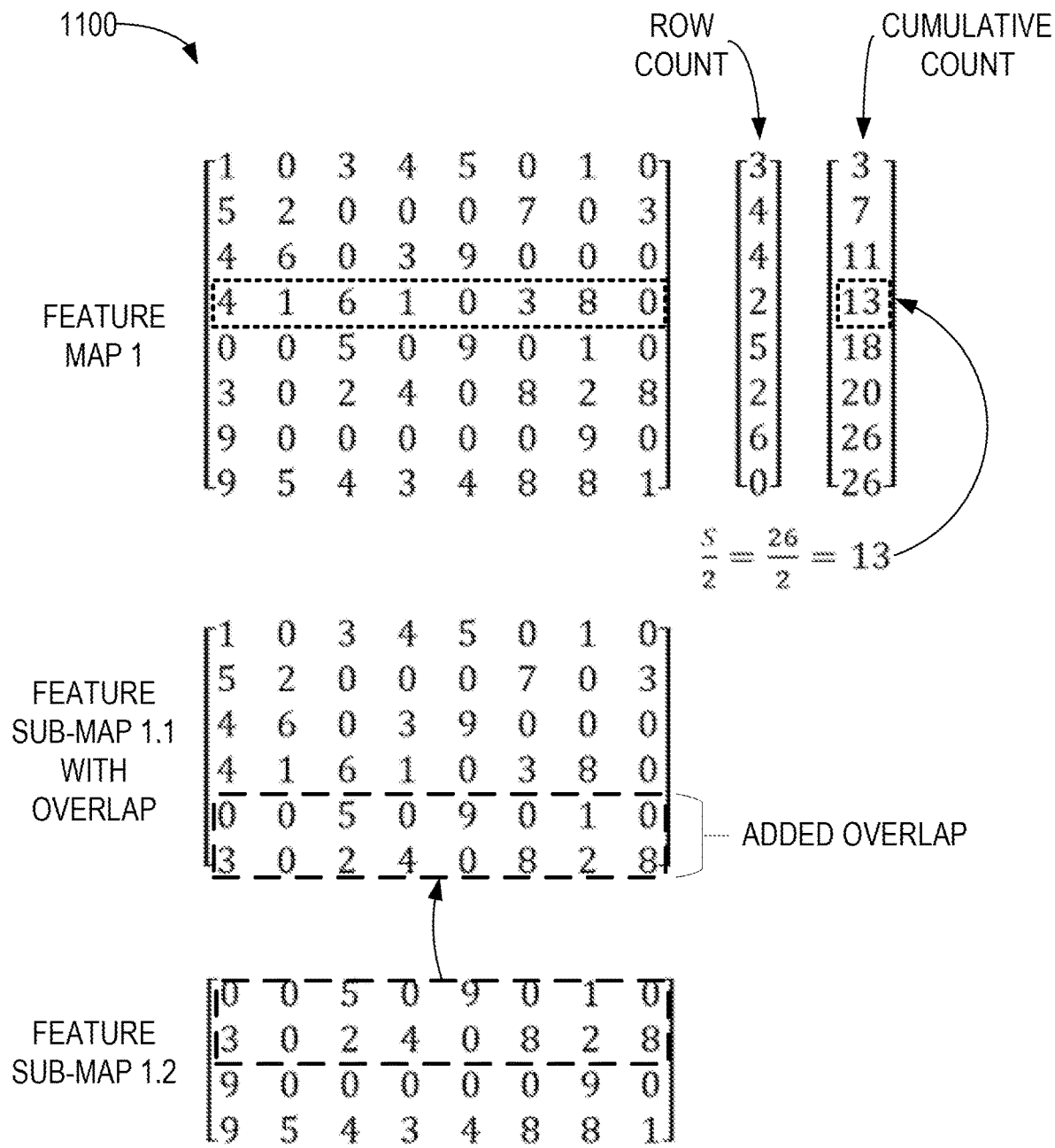
FIG. 11 depict another example of dividing feature maps into one or more feature sub-maps or input tensors in a partitioning block, in accordance with some embodiments of the present disclosure.

FIG. 11 depict another examples 1100 of dividing a feature map into feature sub-maps based on row-wise counts of sparse data elements, in accordance with some embodiments of the present disclosure.

In the depicted example 1100, feature map 1 is the same 8×8 input data matrix that includes sparse (zero-valued) elements. Because there are eight rows, N=8. Here again, a sparsity detector (e.g., 302) in a partitioning block (e.g., 300 of FIG. 3) may determine the number of sparse data elements in each row, which is depicted in the "Row Count" column. The split row ($n_{split}$) is determined as described above with respect to FIG. 10.

Consider an example in which each feature map for each channel of input image data is divided into M feature sub-maps, where M is dependent upon a number of sparse tensor compute units provided (or available) within the sparse tensor compute cluster 230 of FIG. 2 and/or the number of sparse tensor feature map memory units provided (or available) in the sparse tensor memory cluster 250 of FIG. 2. For example, given M=2 sparse tensor compute units in the sparse tensor compute cluster 230, each feature map of each channel may be divided into 2 feature sub-maps. By dividing each feature map into M feature sub-maps corresponding to M number of sparse tensor compute units in the sparse tensor compute cluster 230, each of the M feature sub-maps may be processed independently in one of the M sparse tensor compute units to increase performance and reduce computation time.

As described above with respect to FIG. 3, in some cases it may be desirable to add an overlap between feature sub-maps (e.g., rows that exist in both feature sub-maps). Accordingly, each of the M feature sub-maps may be a matrix having overlapping (K−1, as an example) rows with neighboring feature sub-maps, where (K×K) is the size of the weight matrix 220 (also referred to as a kernel or filter, which may be used for convolution). By overlapping rows of one feature sub-map with a neighboring (or adjacent) feature sub-map, each feature sub-map may be processed independently in the sparse tensor compute cluster 230 and the output feature sub-maps of each of the feature sub-maps may be combined together without needing any intra-cluster coordination between the M feature sub-maps to create an output feature map. Note that a neighboring or adjacent feature sub-maps may refer to feature sub-maps that have been created from the same feature map and which had contiguous rows before the partitioning operation. For example, in FIG. 11, feature sub-maps 1.1 (before overlap) and 1.2 are neighboring or adjacent feature sub-maps.

In other embodiments, the M feature sub-maps may have no overlapping rows and/or columns (as in the example of FIG. 10). Without overlapping, the intermediate results from neighboring feature sub-maps may need to be combined. In some embodiments, with a kernel size of 1×1, overlapping rows and/or columns of the neighboring feature sub-maps may not be needed.

Generally, each of the feature sub-maps of FIGS. 10 and 11 may be generated by the partitioning block 300 of FIG. 3 and stored, if necessary, within DRAM 215 of FIG. 2.

Figure 12:
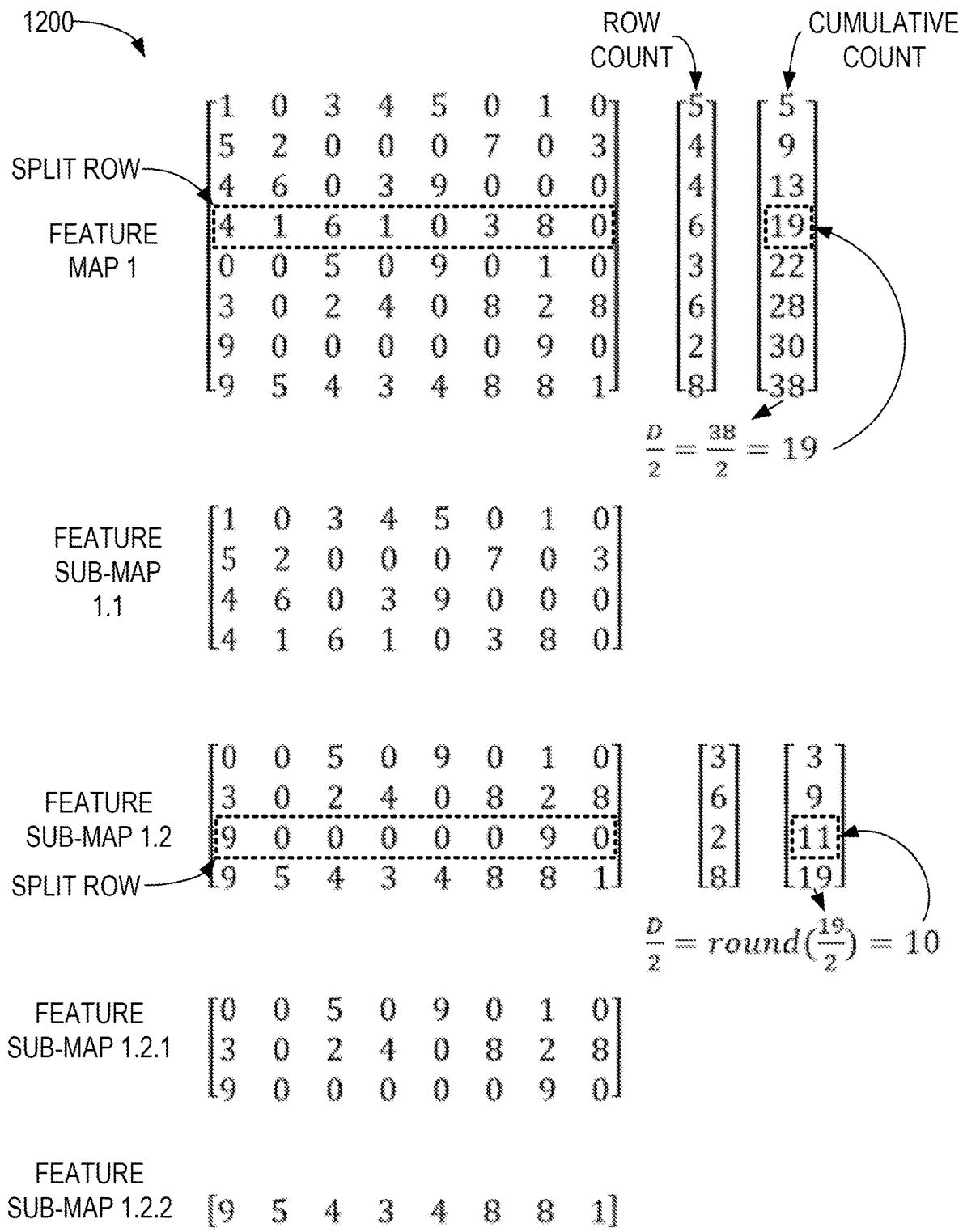
FIG. 12 depict another example of dividing feature maps into one or more feature sub-maps or input tensors in a partitioning block, in accordance with some embodiments of the present disclosure.

FIG. 12 depict an examples 1200 of dividing a feature map into feature sub-maps based on row-wise counts of dense data elements, in accordance with some embodiments of the present disclosure.

In the depicted example 1200, feature map 1 is an 8×8 input data matrix that includes dense (non-zero-valued) elements. Because there are eight rows, N=8. As explained above, a sparsity detector (e.g., 302) in a partitioning block (e.g., 300 of FIG. 3) may determine the number of dense data elements in each row, which is depicted in the "Row Count" column (which is an example of the row counts 304 in FIG. 3). Further, a cumulative dense data element count is depicted in the "Cumulative Count" column. In this example, the number of dense data elements (D) in feature map 1 is 38, and $$\frac{D}{2} = 19.$$

Looking at the cumulative count column, the 19th dense data element is found in the fourth row (as indicated by the rectangles with broken lines). Thus, the fourth row becomes the split row ($n_{split}$).

Based on the identified split row, two feature sub-maps, 1.1 and 1.2) may be generated. As can be seen. The dimensions of each sub-map in this example are Rows(1: $n_{split}$)×Columns(8), and Rows($n_{split}$+1:N)×Columns(8), and $n_{split}$ is defined as the row having the $$\frac{D}{2},$$

th dense data element.

As described above, feature map 1 may be partitioned a number of times (e.g., iteratively) in order to get to a target number of feature sub-maps. Consider the example in which the target number of feature sub-maps was 3 (e.g., based on an availability of 3 STMCs and STCCs), then one of the feature sub-maps from the first partitioning iteration can be further partitioned. Accordingly, in the example, feature sub-map 1.2 is further partitioned into feature sub-maps 1.2.1 and 1.2.2 according to the same method described with respect to the first split. Note in this second split, a rounding operation is used because $$\frac{D}{2}$$

does not give an integer value. The round operation may be configured with a threshold, and in this case $$\frac{D}{2} = 9.5,$$

which rounds to 10. Here, the 10th dense data element is in the third row of feature sub-map 1.2 If, however, the round operation was configured to take, for example, the base integer value without the remainder, then 9 would be used and $n_{split}$ would change so the second row because the second row of feature sub-map 1.2 includes the 9th sparse data element.

Example Method of Partitioning Feature Maps

Figure 13:
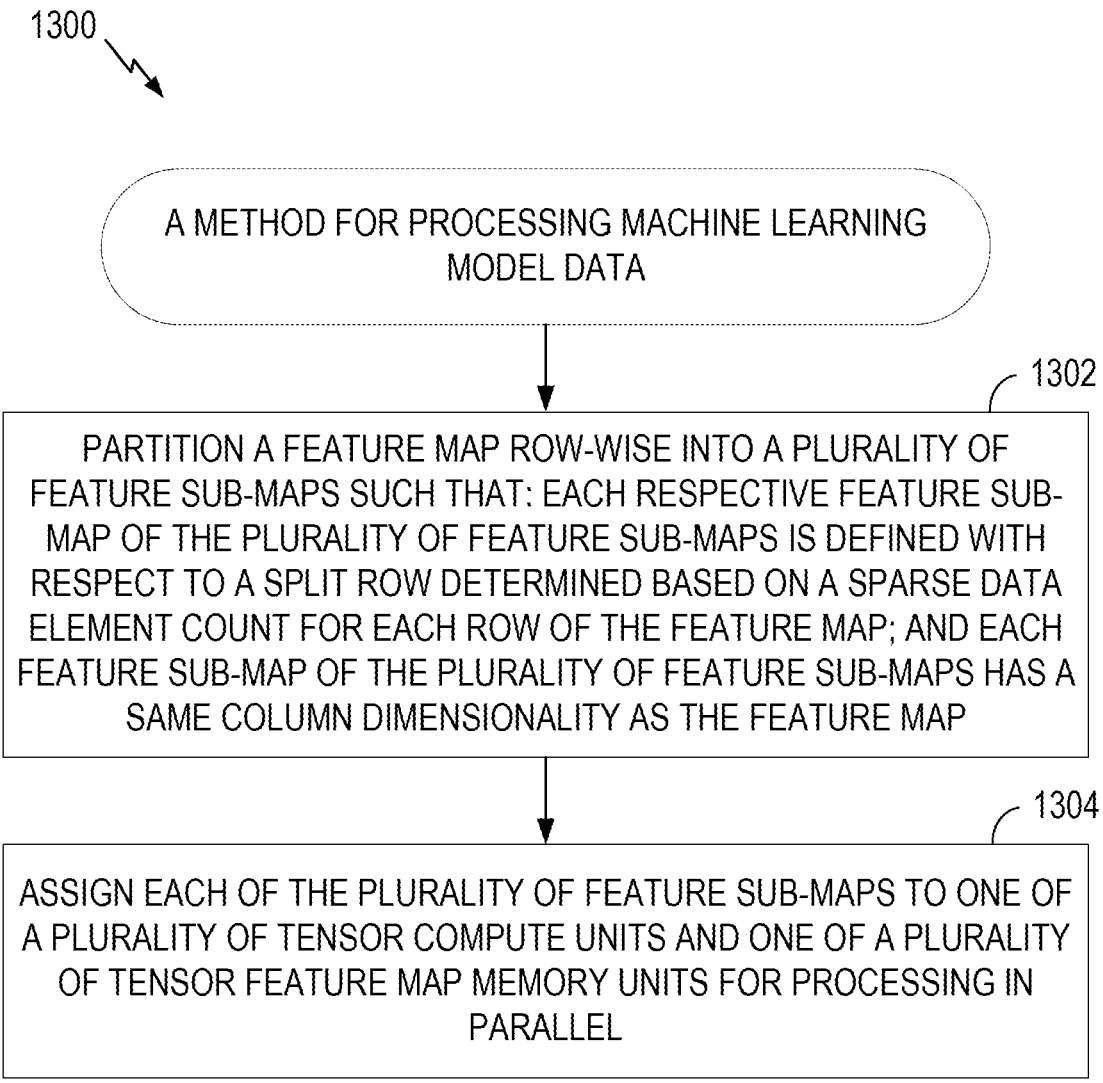
FIG. 13 depicts an example method of partitioning feature maps, in accordance with some embodiments of the present disclosure.

FIG. 13 depicts an example method 1300 of partitioning feature maps, in accordance with some embodiments of the present disclosure.

Method 1300 begins at step 1302 with partitioning a feature map row-wise into a plurality of feature sub-maps. In some embodiments, each respective feature sub-map of the plurality of feature sub-maps is defined with respect to a split row determined based on a sparse data element count for each row of the feature map and each feature sub-map of the plurality of feature sub-maps has a same column dimensionality as the feature map, such as described in the examples above with respect to FIGS. 3, 10, 11, and 12.

Method 1300 then proceeds to step 1304 with assigning each of the plurality of feature sub-maps to one of a plurality of tensor compute units and one of a plurality of tensor feature map memory units for processing in parallel.

In some embodiments, method 1300 further includes determining a count of sparse data elements in each row of the feature map, and partitioning the feature map row-wise into the plurality of feature sub-maps based on the count of sparse data elements in each row of the feature map, such as described in the examples above with respect to FIGS. 3, 10, 11, and 12.

The method of claim 11, further comprising determining a split row for performing the row-wise partitioning based on a total number of sparse data elements in the feature map and an intermediate sum of sparse data elements for one or more sequential rows of the feature map, including the split row.

In some embodiments, method 1300 further includes determining a number of available tensor compute units, and partitioning the feature map row-wise into the plurality of feature sub-maps iteratively until a number of feature sub-maps equals the number of available tensor compute units, such as described above with respect to FIG. 10.

In some embodiments, method 1300 further includes copying a number of rows to at least one feature sub-map of the plurality of feature sub-maps from an adjacent feature sub-map of the plurality of feature sub-maps to create an overlap between the at least one feature sub-map and the adjacent feature sub-map, such as described above with respect to FIG. 11.

In some embodiments, method 1300 further includes determining the number of rows to copy based on a number of rows of a weight matrix, such as described above with respect to FIG. 11.

In some embodiments, each of the plurality of tensor feature map memory units is connected to one of the plurality of tensor compute units, such as described above with respect to FIGS. 4, 5, 8, and 9.

In some embodiments, method 1300 further includes sending a first feature sub-map of the plurality of feature sub-maps assigned to a first tensor compute unit of the plurality of tensor compute units to be stored in a first tensor feature map memory unit of the plurality of tensor feature map memory units associated with the first tensor compute unit.

In some embodiments, a first feature sub-map of the plurality of feature sub-maps is a different size than a second feature sub-map of the plurality of feature sub-maps, such as described above with respect to FIG. 11.

In some embodiments, method 1300 further includes processing each feature sub-map of the plurality of feature sub-maps with its assigned tensor compute unit of the plurality of tensor compute units to generate a plurality of output feature sub-map, and combining the plurality of output feature sub-maps from the plurality of tensor compute units to obtain an output feature map.

Note that FIG. 13 is just one example of a method, and other methods including fewer, additional, or alternative steps are possible consistent with this disclosure.

Example Processing Device

Figure 14:
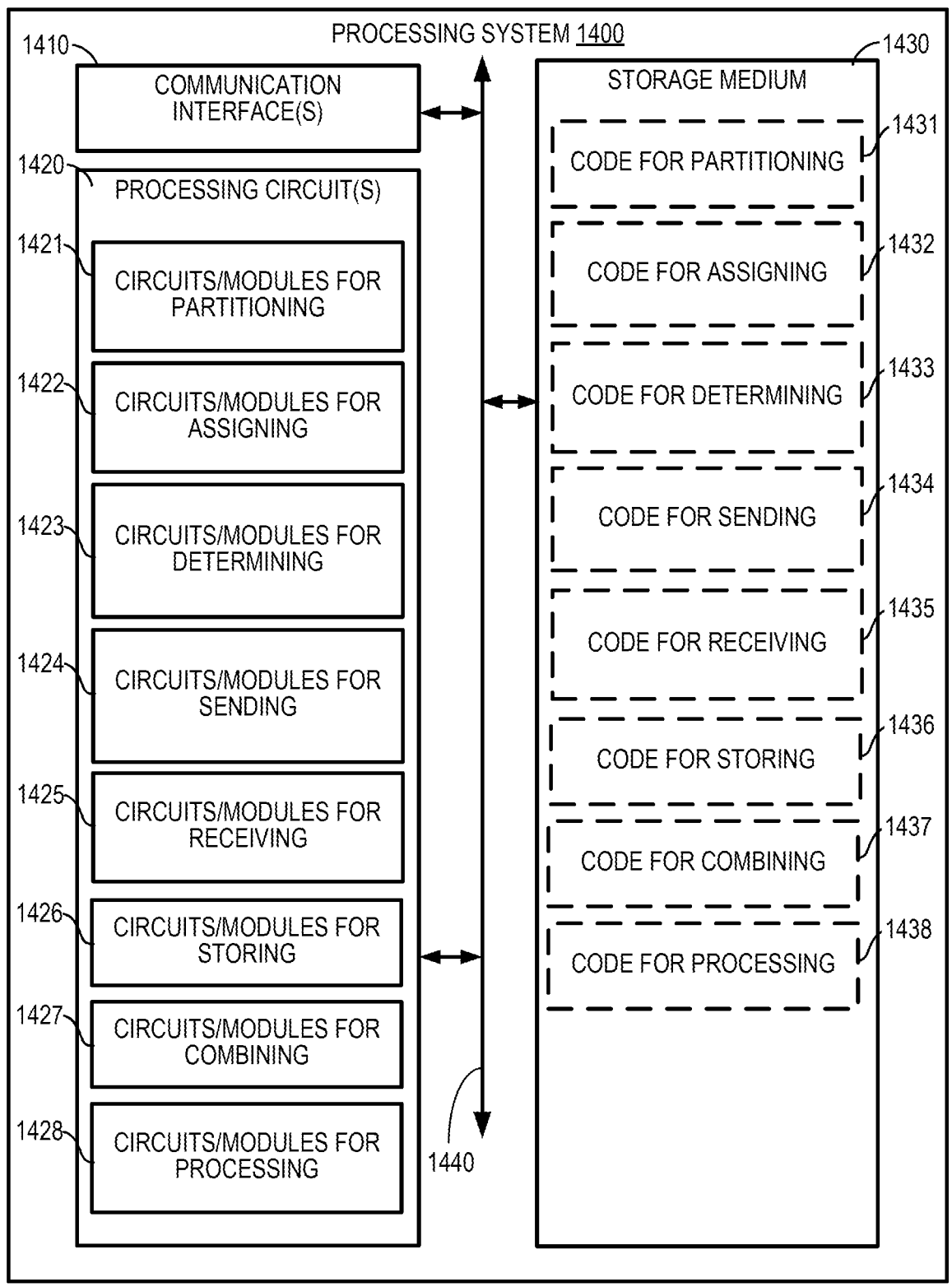
FIG. 14 depicts an example processing system, in accordance with some embodiments of the present disclosure.

FIG. 14 depicts an example processing system 1400, which may be configured to perform the various aspects described herein, including the methods described with respect to FIGS. 10, 11, 12, and/or 13. In some embodiments, processing system 1400 may include, or be included within, accelerator 200 of FIG. 2.

Processing system 1400, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 1400 includes a communication interface(s) 1410, processing circuit(s) 1420 (e.g., at least one processor and/or other suitable circuitry), and storage medium 1430 (e.g., a non-volatile memory). These components can be coupled to and/or placed in electrical communication with one another via a signaling bus 1440 or other suitable component, represented generally by the connection lines in FIG. 14. The signaling bus 1440 may include any number of interconnecting buses and bridges depending on the specific application of the processing circuit(s) 1420 and the overall design constraints. The signaling bus 1440 links together various elements such that each of the communication interface 1410, the processing circuit(s) 1420, and the storage medium 1430 are coupled to and/or in electrical communication with each other. The signaling bus 1440 may also link various other circuits (not shown) such as timing sources, peripherals, voltage regulators, and power management circuits, which are well known in the art, and therefore, will not be described any further.

The communication interface 1410 provides a means for communicating with other devices or apparatuses over a transmission medium. In some implementations, the communication interface 1410 includes circuitry and/or programming (e.g., a program) adapted to facilitate the communication of information bi-directionally with respect to one or more devices in a system. In some implementations, the communication interface 1410 may be configured for wire-based communication. For example, the communication interface 1410 could be a bus interface, a send/receive interface, or some other type of signal interface including drivers, buffers, or other circuitry for outputting and/or obtaining signals (e.g., outputting signal from and/or receiving signals into an integrated circuit). The communication interface 1410 serves as one example of a means for receiving and/or a means for transmitting.

The storage medium 1430 may represent one or more computer-readable, machine-readable, and/or processor-readable devices for storing programming, such as processor executable code or instructions (e.g., software, firmware), electronic data, databases, or other digital information. The storage medium 1430 may also be used for storing data that is manipulated by the processing circuit(s) 1420 when executing programming. The storage medium 1430 may be any available media that can be accessed by a general purpose or special purpose processor, including portable or fixed storage devices, optical storage devices, and various other mediums capable of storing, containing or carrying programming.

By way of example and not limitation, the storage medium 1430 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 1430 may be embodied in an article of manufacture (e.g., a computer program product). By way of example, a computer program product may include a computer-readable medium in packaging materials. In view of the above, in some implementations, the storage medium 1430 may be a non-transitory (e.g., tangible) storage medium. For example, the storage medium 1430 may be a non-transitory computer-readable medium storing computer-executable code, including code to perform operations as described herein.

The storage medium 1430 may be coupled to the processing circuit(s) 1420 so that the processing circuit 1420 can read information from, and write information to, the storage medium 1430. That is, the storage medium 1430 can be coupled to the processing circuit(s) 1420 so that the storage medium 1430 is at least accessible by the processing circuit(s) 1420, including examples where at least one storage medium is integral to the processing circuit(s) 1420 and/or examples where at least one storage medium is separate from the processing circuit(s) 1420 (e.g., resident in the apparatus 1400, external to the apparatus 1400, distributed across multiple entities, etc.).

Programming stored by the storage medium 1430, when executed by the processing circuit(s) 1420, causes the processing circuit(s) 1420 to perform one or more of the various functions and/or process operations described herein. For example, the storage medium 1430 may include operations configured for regulating operations at one or more hardware blocks of the processing circuit(s) 1420, as well as to utilize the communication interface(s) 1410 for wireless communication utilizing their respective communication protocols.

At least some of the processing circuits described herein are generally adapted for processing, including the execution of such programming stored on a storage medium such as storage medium 1430. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 1420 may be adapted to perform any or all of the features, processes, functions, operations and/or routines for any or all of the methods described herein. For example, the processing circuit(s) 1420 may be configured to perform any of the steps, functions, and/or processes described with respect to FIGS. 10, 11, 12, and/or 13. As used herein, the term "adapted" in relation to the processing circuit(s) 1420 may refer to the processing circuit(s) 1420 being one or more of configured, employed, implemented, and/or programmed to perform a particular process, function, operation and/or routine according to various features described herein. The processing circuit(s) 1420 may be a specialized processor, such as an ASIC that serves as a means for (e.g., structure for) carrying out any one of the operations described in conjunction with FIGS. 10, 11, and/or 12. The processing circuit(s) 1420 serves as one example of a means for processing.

According to at least one example of the apparatus 1400, the processing circuit(s) 1420 may include one or more of: a circuit/module 1421 for partitioning (e.g., in accordance with the example of FIGS. 10, 11, 12, and/or 13); a circuit/module 1422 for assigning; a circuit/module 1423 for determining; a circuit/module 1424 for sending; a circuit/module 1425 for receiving; a circuit/module 1426 for storing; a circuit/module 1427 for combining; and a circuit/module 1428 for processing. Notably, these are just some examples, and others are possible based on the various aspects described herein.

As mentioned above, a program stored by the storage medium 1430, when executed by the processing circuit(s) 1420, causes the processing circuit(s) 1420 to perform one or more of the various functions and/or process operations described herein. For example, the program may cause the processing circuit(s) 1420 to perform and/or control the various functions, steps, and/or processes described herein with respect to FIGS. 10, 11, 12, and/or 13.

As shown in FIG. 14, the storage medium 1430 may include one or more of: code 1431 for partitioning; code 1432 for assigning; code 1433 for determining; code 1434 for sending; code 1435 for receiving; code 1436 for storing; code 1437 for combining; and code 1438 for processing. Notably, these are just some examples, and others are possible based on the various aspects described herein.

In at least some examples, the various circuits/modules in 1420 as well as other processing elements described herein may comprise means for performing the various functions described herein, including the functions enabled by the various codes stored in storage medium 1430.

Example Clauses

Implementation examples are described in the following numbered clauses:

Clause 1: A method, comprising: partitioning a feature map row-wise into a plurality of feature sub-maps such that: each respective feature sub-map of the plurality of feature sub-maps is defined with respect to a split row determined based on a dense data element count for each row of the feature map; and each feature sub-map of the plurality of feature sub-maps has a same column dimensionality as the feature map; and assigning each of the plurality of feature sub-maps to one of a plurality of tensor compute units and one of a plurality of tensor feature map memory units for processing in parallel.

Clause 2: The method of Clause 1, further comprising: determining a count of dense data elements in each row of the feature map; and partitioning the feature map row-wise into the plurality of feature sub-maps based on the count of dense data elements in each row of the feature map.

Clause 3: The method of Clause 2, further comprising determining a split row for performing the row-wise partitioning based on a total number of dense data elements in the feature map and an intermediate sum of dense data elements for one or more sequential rows of the feature map, including the split row.

Clause 4: The method of any one of Clauses 1-3, further comprising: determining a number of available tensor compute units; and partitioning the feature map row-wise into the plurality of feature sub-maps iteratively until a number of feature sub-maps equals the number of available tensor compute units.

Clause 5: The method of any one of Clauses 1-4, further comprising copying a number of rows to at least one feature sub-map of the plurality of feature sub-maps from an adjacent feature sub-map of the plurality of feature sub-maps to create an overlap between the at least one feature sub-map and the adjacent feature sub-map.

Clause 6: The method of Clause 5, further comprising determining the number of rows to copy based on a number of rows of a weight matrix.

Clause 7: The method of any one of Clauses 1-6, wherein: each of the plurality of tensor feature map memory units is connected to one of the plurality of tensor compute units, and the method further comprises sending a first feature sub-map of the plurality of feature sub-maps assigned to a first tensor compute unit of the plurality of tensor compute units to be stored in a first tensor feature map memory unit of the plurality of tensor feature map memory units associated with the first tensor compute unit.

Clause 8: The method of any one of Clauses 1-7, wherein a first feature sub-map of the plurality of feature sub-maps is a different size than a second feature sub-map of the plurality of feature sub-maps.

Clause 9: The method of any one of Clauses 1-8, further comprising: processing each feature sub-map of the plurality of feature sub-maps with its assigned tensor compute unit of the plurality of tensor compute units to generate a plurality of output feature sub-map, and combining the plurality of output feature sub-maps from the plurality of tensor compute units to obtain an output feature map.

Clause 10: A method, comprising: partitioning a feature map row-wise into a plurality of feature sub-maps such that: each respective feature sub-map of the plurality of feature sub-maps is defined with respect to a split row determined based on a sparse data element count for each row of the feature map; and each feature sub-map of the plurality of feature sub-maps has a same column dimensionality as the feature map; and assigning each of the plurality of feature sub-maps to one of a plurality of tensor compute units and one of a plurality of tensor feature map memory units for processing in parallel.

Clause 11: The method of Clause 10, further comprising: determining a count of sparse data elements in each row of the feature map; and partitioning the feature map row-wise into the plurality of feature sub-maps based on the count of sparse data elements in each row of the feature map.

Clause 12: The method of Clause 11, further comprising determining a split row for performing the row-wise partitioning based on a total number of sparse data elements in the feature map and an intermediate sum of sparse data elements for one or more sequential rows of the feature map, including the split row.

Clause 13: The method of any one of Clauses 10-12, further comprising: determining a number of available tensor compute units; and partitioning the feature map row-wise into the plurality of feature sub-maps iteratively until a number of feature sub-maps equals the number of available tensor compute units.

Clause 14: The method of any one of Clauses 10-13, further comprising copying a number of rows to at least one feature sub-map of the plurality of feature sub-maps from an adjacent feature sub-map of the plurality of feature sub-maps to create an overlap between the at least one feature sub-map and the adjacent feature sub-map.

Clause 15: The method of Clause 14, further comprising determining the number of rows to copy based on a number of rows of a weight matrix.

Clause 16: The method of any one of Clauses 10-15, wherein: each of the plurality of tensor feature map memory units is connected to one of the plurality of tensor compute units, and the method further comprises sending a first feature sub-map of the plurality of feature sub-maps assigned to a first tensor compute unit of the plurality of tensor compute units to be stored in a first tensor feature map memory unit of the plurality of tensor feature map memory units associated with the first tensor compute unit.

Clause 17: The method of any one of Clauses 10-16, wherein a first feature sub-map of the plurality of feature sub-maps is a different size than a second feature sub-map of the plurality of feature sub-maps.

Clause 18: The method of any one of Clauses 10-17, further comprising: processing each feature sub-map of the plurality of feature sub-maps with its assigned tensor compute unit of the plurality of tensor compute units to generate a plurality of output feature sub-map, and combining the plurality of output feature sub-maps from the plurality of tensor compute units to obtain an output feature map.

Clause 19: A processing system, comprising: a memory comprising computer-executable instructions; and a processor configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium comprising computer-executable instructions that, when executed by a processor of a processing system, cause the processing system to perform a method in accordance with any one of Clauses 1-18.

Clause 22: A computer program product embodied on a computer-readable storage medium comprising code for performing a method in accordance with any one of Clauses 1-18.

ADDITIONAL CONSIDERATIONS

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus, comprising:
   a tensor compute cluster comprising a plurality of tensor compute units configured to process a plurality of feature sub-maps in a machine learning application;
   a tensor memory cluster comprising a plurality of tensor feature map memory units configured to store the plurality of feature sub-maps; and
   processing circuitry configured to:
     partition a feature map row-wise into the plurality of feature sub-maps such that:
       each respective feature sub-map of the plurality of feature sub-maps is defined with respect to a split row determined based on a dense data element count for each row of the feature map; and
       each feature sub-map of the plurality of feature sub-maps has a same column dimensionality as the feature map; and
     assign each of the plurality of feature sub-maps to one of the plurality of tensor compute units and one of the plurality of tensor feature map memory units for processing in parallel.

2. The apparatus of claim 1, wherein the processing circuitry is further configured to:
   determine a count of dense data elements in each row of the feature map; and
   partition the feature map row-wise into the plurality of feature sub-maps based on the count of dense data elements in each row of the feature map.

3. The apparatus of claim 2, wherein the processing circuitry is further configured to determine the split row for performing the row-wise partitioning based on a total number of dense data elements in the feature map and an intermediate sum of dense data elements for one or more sequential rows of the feature map, including the split row.

4. The apparatus of claim 1, wherein the processing circuitry is further configured to:
   determine a number of available tensor compute units; and
   partition the feature map row-wise into the plurality of feature sub-maps iteratively until a number of feature sub-maps equals the number of available tensor compute units.

5. The apparatus of claim 1, wherein the processing circuitry is further configured to copy a number of rows to at least one feature sub-map of the plurality of feature sub-maps from an adjacent feature sub-map of the plurality of feature sub-maps to create an overlap between the at least one feature sub-map and the adjacent feature sub-map.

6. The apparatus of claim 5, wherein the processing circuitry is further configured to determine the number of rows to copy based on a number of rows of a weight matrix.

7. The apparatus of claim 1, wherein:
   each of the plurality of tensor feature map memory units is connected to one of the plurality of tensor compute units, and
   the processing circuitry is further configured to send a first feature sub-map of the plurality of feature sub-maps assigned to a first tensor compute unit of the plurality of tensor compute units to be stored in a first tensor feature map memory unit of the plurality of tensor feature map memory units associated with the first tensor compute unit.

8. The apparatus of claim 1, wherein a first feature sub-map of the plurality of feature sub-maps is a different size than a second feature sub-map of the plurality of feature sub-maps.

9. The apparatus of claim 1, wherein:
   each of the plurality of tensor compute units is configured to process its assigned feature sub-map of the plurality of feature sub-maps to generate an output feature sub-map, and
   the processing circuitry is further configured to combine the output feature sub-map from each of the plurality of tensor compute units to obtain an output feature map.

10. A method, comprising:
    partitioning a feature map row-wise into a plurality of feature sub-maps such that:
      each respective feature sub-map of the plurality of feature sub-maps is defined with respect to a split row determined based on a dense data element count for each row of the feature map; and
      each feature sub-map of the plurality of feature sub-maps has a same column dimensionality as the feature map; and
    assigning each of the plurality of feature sub-maps to one of a plurality of tensor compute units and one of a plurality of tensor feature map memory units for processing in parallel.

11. The method of claim 10, further comprising:
    determining a count of dense data elements in each row of the feature map; and
    partitioning the feature map row-wise into the plurality of feature sub-maps based on the count of dense data elements in each row of the feature map.

12. The method of claim 11, further comprising determining a split row for performing the row-wise partitioning based on a total number of dense data elements in the feature map and an intermediate sum of dense data elements for one or more sequential rows of the feature map, including the split row.

13. The method of claim 10, further comprising:
    determining a number of available tensor compute units; and
    partitioning the feature map row-wise into the plurality of feature sub-maps iteratively until a number of feature sub-maps equals the number of available tensor compute units.

14. The method of claim 10, further comprising copying a number of rows to at least one feature sub-map of the plurality of feature sub-maps from an adjacent feature sub-map of the plurality of feature sub-maps to create an overlap between the at least one feature sub-map and the adjacent feature sub-map.

15. The method of claim 14, further comprising determining the number of rows to copy based on a number of rows of a weight matrix.

16. The method of claim 10, wherein:
each of the plurality of tensor feature map memory units is connected to one of the plurality of tensor compute units, and
the method further comprises sending a first feature sub-map of the plurality of feature sub-maps assigned to a first tensor compute unit of the plurality of tensor compute units to be stored in a first tensor feature map memory unit of the plurality of tensor feature map memory units associated with the first tensor compute unit.

17. The method of claim 10, wherein a first feature sub-map of the plurality of feature sub-maps is a different size than a second feature sub-map of the plurality of feature sub-maps.

18. The method of claim 10, further comprising:
processing each feature sub-map of the plurality of feature sub-maps with its assigned tensor compute unit of the plurality of tensor compute units to generate a plurality of output feature sub-map, and
combining the plurality of output feature sub-maps from the plurality of tensor compute units to obtain an output feature map.

19. A non-transitory computer-readable medium comprising computer-executable instructions that, when executed by a processor of a processing system, cause the processing system to perform a method, the method comprising:
partitioning a feature map row-wise into a plurality of feature sub-maps such that:
each respective feature sub-map of the plurality of feature sub-maps is defined with respect to a split row determined based on a dense data element count for each row of the feature map; and
each feature sub-map of the plurality of feature sub-maps has a same column dimensionality as the feature map; and
assigning each of the plurality of feature sub-maps to one of a plurality of tensor compute units and one of a plurality of tensor feature map memory units for processing in parallel.

20. The non-transitory computer-readable medium of claim 19, wherein the method further comprises:
determining a count of dense data elements in each row of the feature map; and
partitioning the feature map row-wise into the plurality of feature sub-maps based on the count of dense data elements in each row of the feature map.

* * * * *